(12) United States Patent
Furutake

(10) Patent No.: US 11,675,154 B2
(45) Date of Patent: Jun. 13, 2023

(54) CAMERA MODULE

(71) Applicant: DENSO CORPORATION, Kariya (JP)

(72) Inventor: Yasuki Furutake, Kariya (JP)

(73) Assignee: DENSO CORPORATION, Kariya (JP)

( * ) Notice: Subject to any disclaimer, the term of this patent is extended or adjusted under 35 U.S.C. 154(b) by 527 days.

(21) Appl. No.: 16/580,277

(22) Filed: Sep. 24, 2019

(65) Prior Publication Data

US 2020/0096723 A1 Mar. 26, 2020

(30) Foreign Application Priority Data

Sep. 26, 2018 (JP) .............................. JP2018-180279

(51) Int. Cl.
*G02B 7/02* (2021.01)
*B60R 11/04* (2006.01)
*B60R 11/00* (2006.01)
*G02B 13/00* (2006.01)

(52) U.S. Cl.
CPC .............. *G02B 7/021* (2013.01); *B60R 11/04* (2013.01); *G02B 13/0045* (2013.01); *B60R 2011/0026* (2013.01)

(58) Field of Classification Search
CPC .... G02B 7/10; G02B 7/02; G02B 7/021–028; G02B 13/0045; B60R 2011/0026; B60R 11/04
USPC .......................... 359/703–704, 826–830, 763
See application file for complete search history.

(56) References Cited

U.S. PATENT DOCUMENTS

| 5,717,528 | A | 2/1998 | Ihara et al. |
| 2004/0010352 | A1* | 1/2004 | Stromme ......... G08G 1/096758 701/1 |
| 2004/0223074 | A1 | 11/2004 | Takada |
| 2006/0202293 | A1 | 9/2006 | Bogdan et al. |
| 2008/0019028 | A1* | 1/2008 | Chen ..................... G02B 7/026 359/826 |
| 2011/0085070 | A1 | 4/2011 | Kang et al. |
| 2011/0157727 | A1 | 6/2011 | Sasaki et al. |
| 2012/0207461 | A1 | 8/2012 | Okuda |

(Continued)

FOREIGN PATENT DOCUMENTS

| JP | H10-123386 A | 5/1998 |
| JP | 2011-48123 A | 3/2011 |

(Continued)

OTHER PUBLICATIONS

IP.com search (Year: 2023).*
U.S. Appl. No. 16/507,439; filed Jul. 10, 2019, Jul. 10, 2019, Masui et al.

*Primary Examiner* — Travis S Fissel
(74) *Attorney, Agent, or Firm* — Maschoff Brennan

(57) ABSTRACT

A camera module is attached to an inside of a windshield of a vehicle to capture an image of an outside view. The camera module includes an imager, a lens set equipped with a first lens and a second lens, a lens barrel in which the lens set is disposed, and a main spacer fit in the lens barrel. The lens barrel retains the first lens using an axial force oriented along an optical axis of the lens set. The main spacer is disposed between the first and second lenses and transmits the axial force from one of the first and second lenses to the other. This structure enables the camera module to be reduced in size without sacrificing the optical performance thereof.

9 Claims, 14 Drawing Sheets

(56) References Cited

U.S. PATENT DOCUMENTS

2014/0160581 A1\* 6/2014 Cho ................... G02B 13/0035
                                                          359/738
2018/0284398 A1   10/2018 Furutake et al.
2019/0187402 A1    6/2019 Masuzawa

FOREIGN PATENT DOCUMENTS

| JP | 2012-166615 A | 9/2012 | |
| JP | 2014-041167 A | 3/2014 | |
| JP | 2019-074728 A | 5/2019 | |
| WO | WO-2008093752 A1 \* | 8/2008 | ............... G02B 9/34 |
| WO | WO-2010061604 A1 \* | 6/2010 | ............. G02B 7/021 |

\* cited by examiner

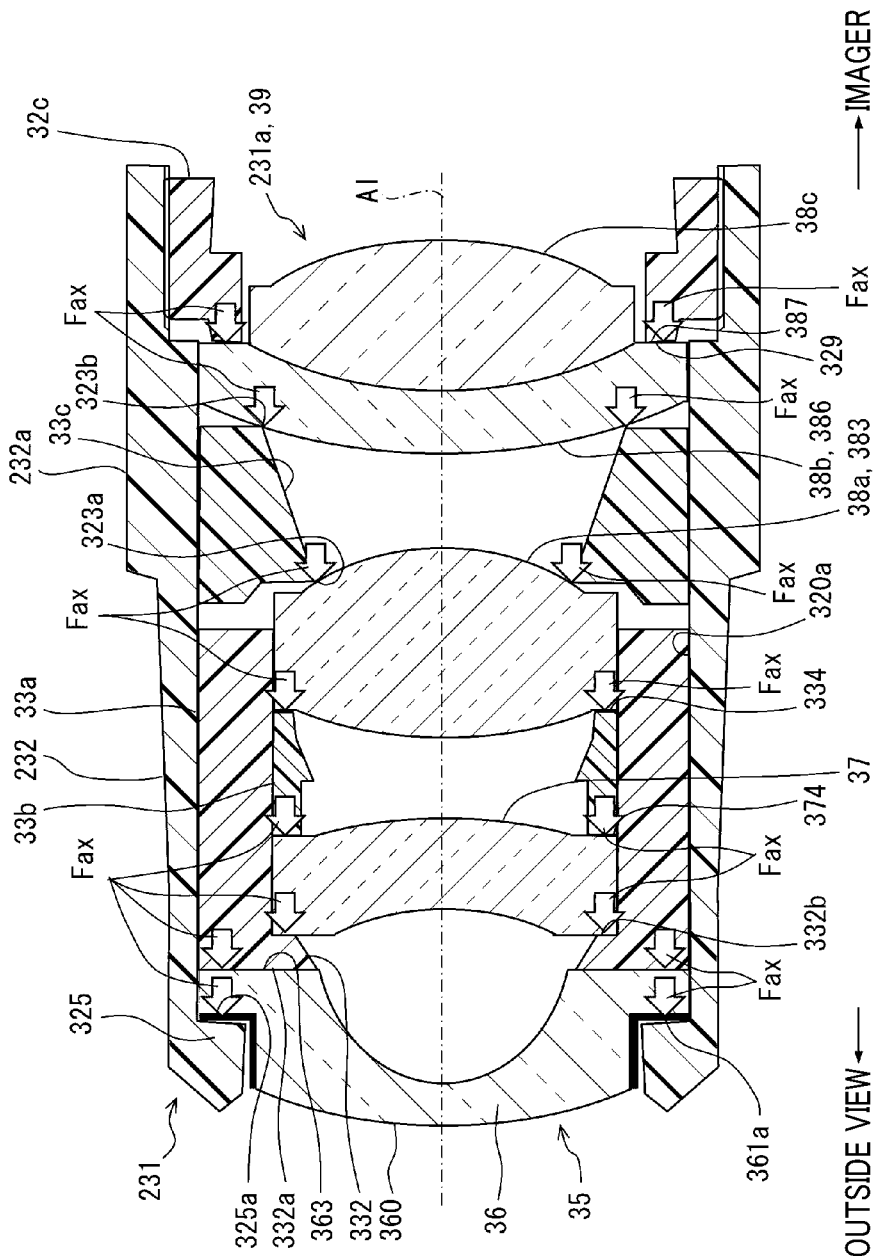

CAMERA MODULE

CROSS REFERENCE TO RELATED DOCUMENT

The present application claims the benefit of priority of Japanese Patent Application No. 2018-180279 filed on Sep. 26, 2018, the disclosure of which is incorporated herein by reference.

BACKGROUND

1 Technical Field

This disclosure relates generally to a camera module.

2 Background Art

There is known a lens holder in which a lens unit made up of a first lens and a second lens which are joined together and a third lens are retained. The lens holder includes a hollow outer cylinder and a cylindrical spacer disposed inside the outer cylinder. The spacer surrounds an outer periphery of the second lens. An annular lens retainer is fastened to a thread on the outer cylinder to exert an axial force on the first lens.

In recent years, automotive vehicles have been equipped with a camera module for use in an advanced driver-assistance system or an autonomous driving system. The camera module is required to have an optical performance to take a recognizable image of a wide-angle outside view. It is difficult for the structure in the above publication to have a decreased size without sacrificing the optical performance of a lens system when used as a camera module for vehicles.

SUMMARY

It is an object of this disclosure to provide a camera module which is enabled to have a decreased size without sacrificing an optical performance thereof.

According to one aspect of this disclosure, there is provided a camera module which is attached to an inner side of a windshield of a vehicle and works to capture an image of an outside view of the vehicle. The camera module comprises: (a) an imager which captures an image of an outside view; (b) a lens set which includes an outside view lens and a small-diameter lens located closer to the imager than the outside view lens is and through which light from the outside view passes to form an image in the imager; (c) a lens barrel in which the lens set is disposed; and (d) an inner lens barrel which is fit in the lens barrel and has the small-diameter lens disposed therein. The lens barrel includes a lens barrel axial force applying portion which retains the outside view lens using an axial force oriented along an optical axis (A1) of the lens set. The inner lens barrel is disposed between the small-diameter lens and the outside view lens and has an axial force-transmitting portion which transmits the axial force from one of the small-diameter lens and the outside view lens to the other.

The small-diameter lens is disposed inside the inner lens barrel and is smaller in diameter than the outside view lens. The axial force-transmitting portion is disposed between the outside view lens and the small-diameter lens and functions to achieve the transmission of the axial force between the outside view lens and the small-diameter lens. This ensures exertion of the axial force on the outside view lens and the small-diameter lens although the small-diameter lens and the outside view lens are different in diameter from each other, thereby enabling the small-diameter lens to be reduced in size without sacrificing the optical performance of the camera module.

According to the second aspect of this disclosure, there is provided a camera module which is attached to an inner side of a windshield of a vehicle and works to capture an image of an outside view of the vehicle. The camera module comprises: (a) an imager which captures an image of an outside view; (b) a lens set which includes an outside view lens through which light from the outside view passes to form an image in the imager; and (c) a lens barrel in which the lens set is disposed. The outside view lens has an optical surface facing the outside view and a step located outside the optical surface in a radial direction of the outside view lens. The lens barrel includes a lens barrel axial force applying portion which retains the step using an axial force oriented along an optical axis of the lens set.

The outside view lens has the step located outside the optical surface in the radial direction. The lens barrel is equipped with the lens barrel axial force applying portion to retain the step using the axial force oriented along the optical axis. The lens barrel axial force applying portion is disposed in a space defined by a recess of the step. This facilitates reduction in size of a front end portion of the lens barrel located close to the outside view lens, thereby enabling the front end portion of the lens barrel to be decreased in diameter without sacrificing a required outside diameter of the optical surface. This enables the size of the lens barrel to be reduced while ensuring a required level of the optical performance.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 14(*b*) is a partially sectional view which illustrates a front end portion of a lens barrel which has a diameter not decreased;

FIG. 17 is a longitudinal sectional view which demonstrates an axial force acting on a lens set and a lens barrel according to the second embodiment.

DESCRIPTION OF THE PREFERRED EMBODIMENTS

Embodiments will be described below with reference to the drawings. Throughout the embodiments, the same reference numbers will refer to the same parts, and explanation thereof in detail will be omitted here. When only parts of components in one of the embodiments are referred to, the explanation of the other parts in the other embodiments is applied. Each of the embodiments may be designed to include all possible combinations or modifications of the components in the other embodiments

First Embodiment

Figure 1:
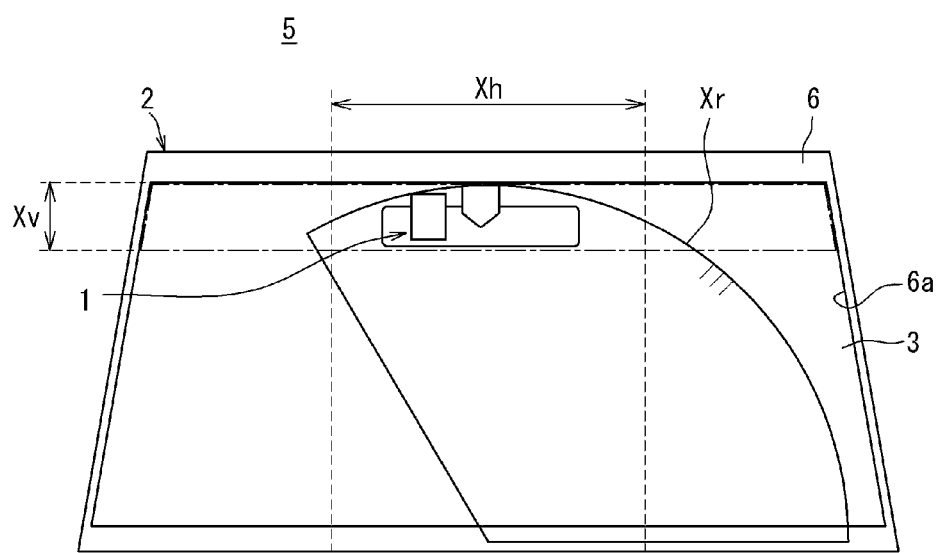
FIG. 1 is a front view which illustrates a vehicle equipped with a camera module according to the first embodiment.
Figure 2:
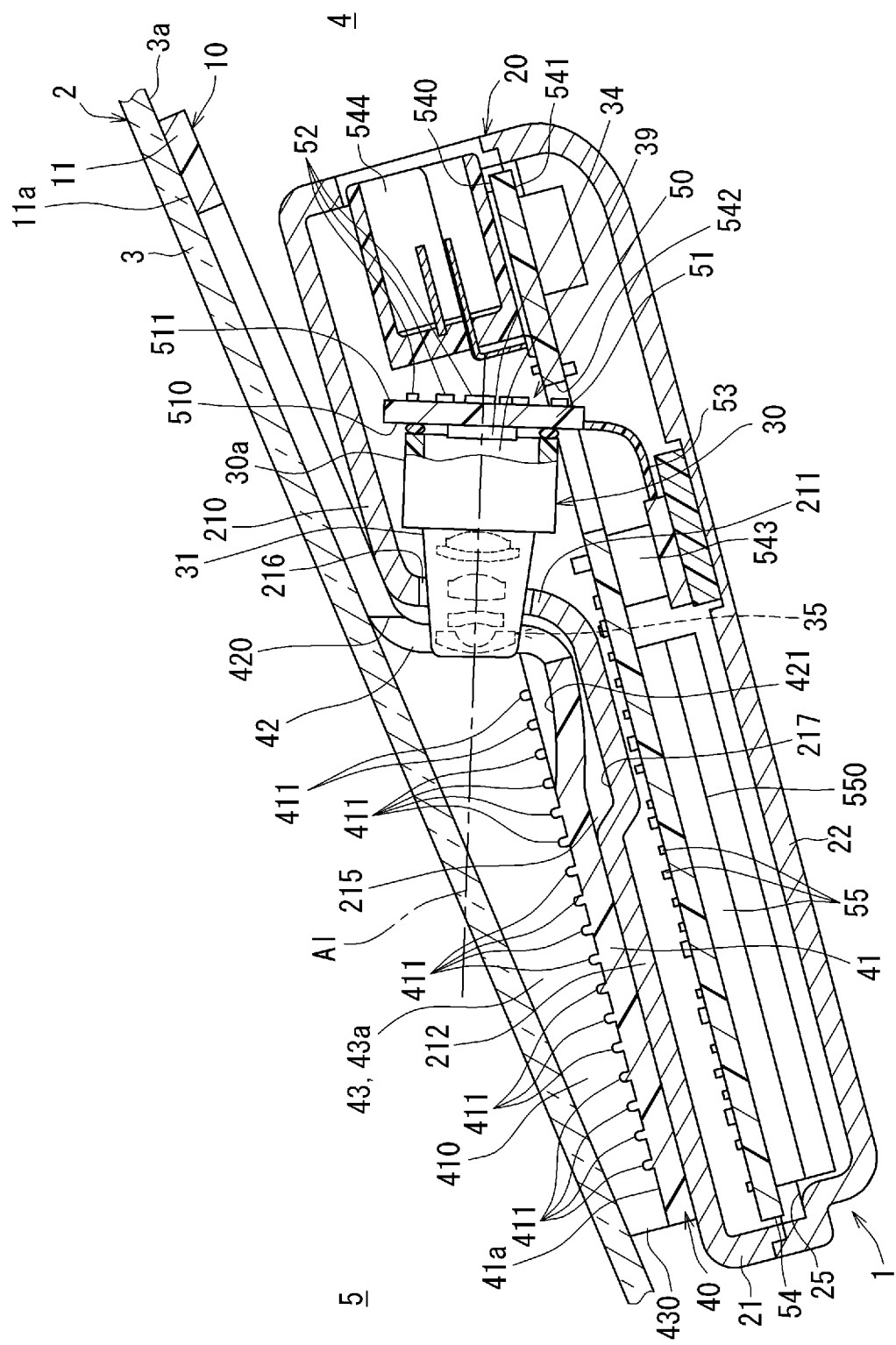
FIG. 2 is a longitudinal sectional view which illustrates a camera module according to the first embodiment.

The camera module 1 in the first embodiment is, as illustrated in FIGS. 1 and 2, mounted in the vehicle 2 and works to capture an image of the outside view 5. In the following discussion, a vertical direction of the vehicle 2 on a horizontal plane will also be referred to as a top-to-bottom direction. A length wise direction of the vehicle 2 will also be referred to as a longitudinal direction. A width-wise direction of the vehicle 2 will also be referred to as a lateral direction.

The camera module 1 is attached to an inside surface of the front windshield 3 of the vehicle 2. The front windshield 3 is located in front of a driver's seat in the vehicle 2. The front windshield 3 isolates the passenger compartment 4 of the vehicle 2 from the outside view 5. The front windshield 3 is made of, for example, a transparent or translucent material, such as glass, through which light or optical image passes from the outside view 5 into the passenger compartment 4.

The camera module 1 is mounted on a portion of the front windshield 3 which does not disturb or block the view of a driver sitting on a driver's seat in the passenger compartment 4. Specifically, the camera module 1 is, as clearly illustrated in FIG. 1, located in a vertical range Xv which occupies about 20% of an area of the window 6*a* defined by the pillar 6 retaining a peripheral edge of the front windshield 3 from an upper edge of the window 6*a*. The camera module 1 is also located in a horizontal range Xh of about 15 cm from the middle to the right and left of the window 6*a*. In other words, the camera module 1 is, therefore, arranged in a wiping range Xr where a wiper moves on the front windshield 3 and on a portion of the front windshield 3 which is inclined about 22° to 90° in the longitudinal direction of the vehicle 2.

Figure 3:
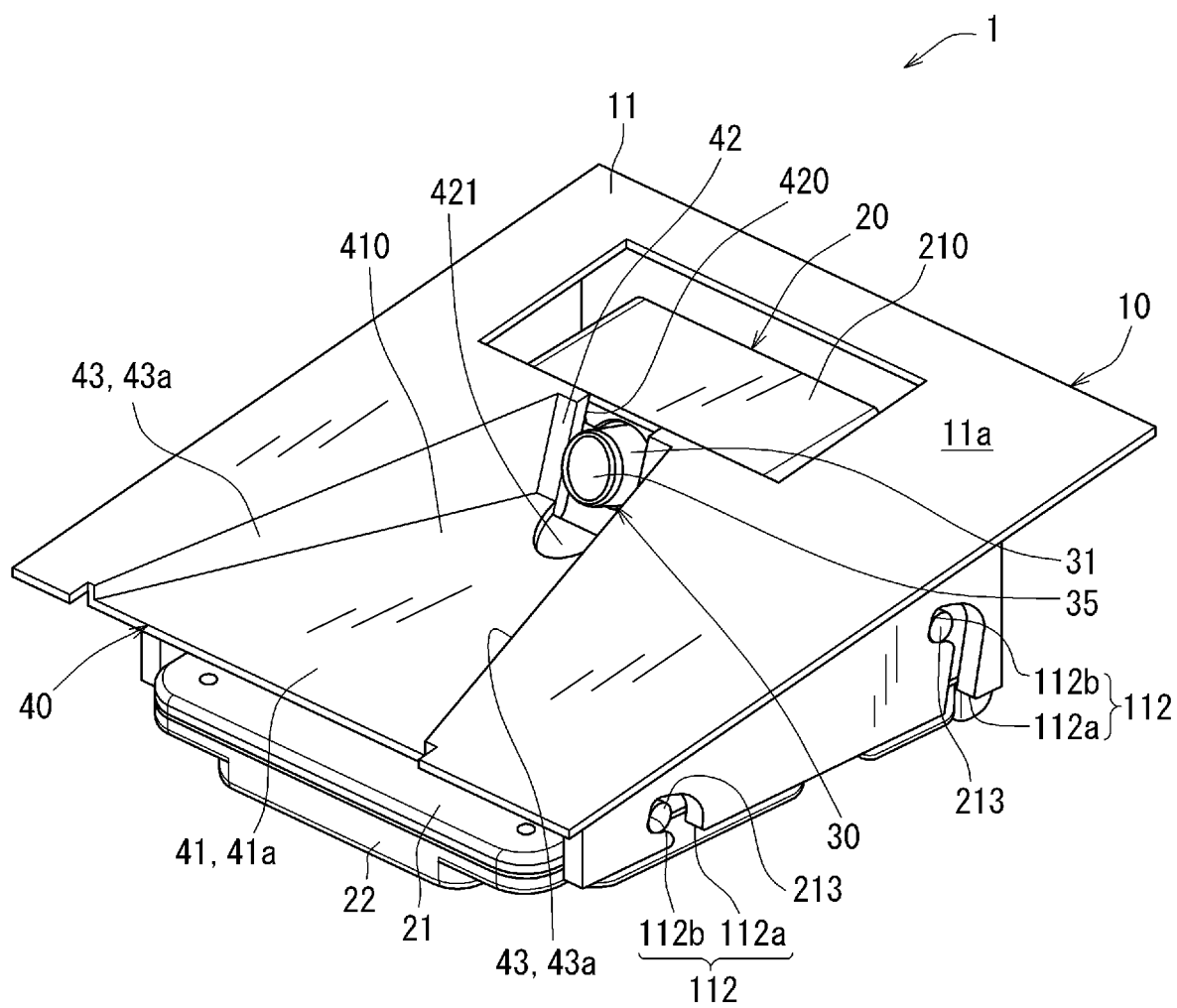
FIG. 3 is a perspective view which illustrates an upper surface of a camera module according to the first embodiment.
Figure 4:
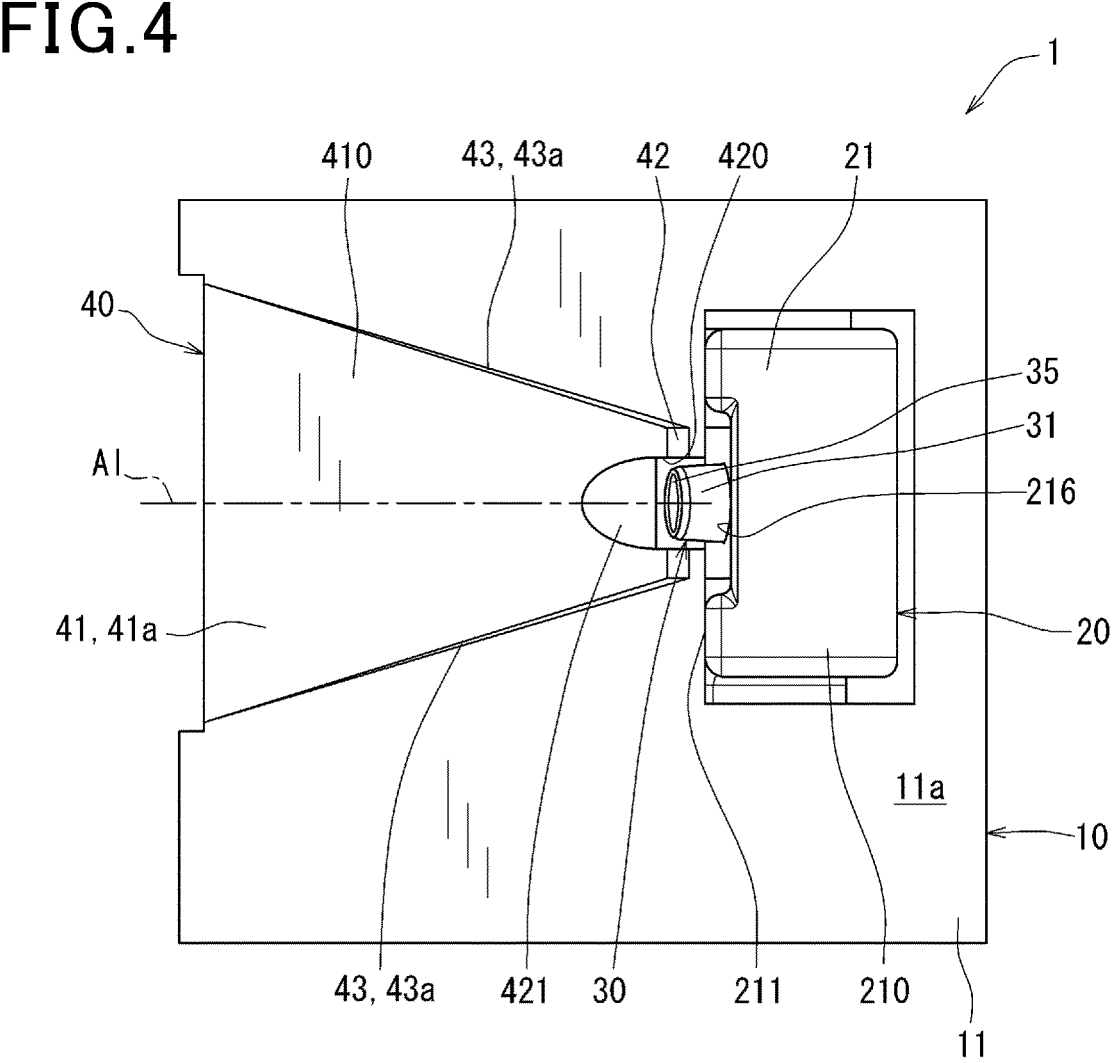
FIG. 4 is a plan view which illustrates a camera module according to the first embodiment.

The camera module 1 is, as illustrated in FIGS. 2 to 4, equipped with the bracket assembly 10, the camera casing 20, the optical assembly 30, the hood 40, and the circuit unit 50. The bracket assembly 10 is mainly made of the bracket body 11. The bracket body 11 is made of an easy-to-machine hard material, such as resin, in a flat shape as a whole. The bracket body 11 is arranged along the inner surface 3*a* of the front windshield 3. The bracket body 11 has the flat upper surface 11*a* firmly adhered to the inner surface 3*a* of the front windshield 3, so that the bracket assembly 10 is undetachably or permanently secured to the front windshield 3 of the vehicle 2.

The camera casing 20 is, as clearly illustrated in FIGS. 2 to 5, made of a pair of casing members 21 and 22 attached to each other. Each of the casing members 21 and 22 is made of hard material, such as aluminum, which has a relatively high degree of heat dissipation and shaped in a hollow form.

The upside-down cup shaped upper casing member 21 is arranged beneath the bracket assembly 10 to have an opening facing away from the bracket assembly 10. The upper casing member 21, as clearly illustrated in FIGS. 3 and 5, has four fitting protrusions 213 two formed on each side thereof. The two fitting protrusions 213 on each side are separate from each other in the longitudinal direction of the vehicle 2.

The bracket body 11, as illustrated in FIG. 3, has formed therein a plurality of fitting grooves 112 one for each of the fitting protrusions 213. Each of the fitting grooves 112 is of an L-shape with the open end 112*a* and the closed end 112*b*. The camera casing 20 is detachably attached to the bracket assembly 10 by moving each of the fitting protrusions 213 is moved from the open end 112*a* until it reaches the closed end 112*b* of one of the fitting grooves 112. In other words, the camera casing 20 hands on the bracket assembly and is positioned relative to the front windshield 3.

The upper casing member 21, as illustrated in FIGS. 2 to 5, has an upper wall including the windshield-facing wall portion 210, the bent wall portion 211, and the recessed wall portion 212. The windshield-facing wall portion 210 is oriented to face the inner surface 3*a* of the front windshield 3 through the bracket assembly 10. The windshield-facing wall portion 210 is held in this condition close to the front windshield 3.

Figure 5:
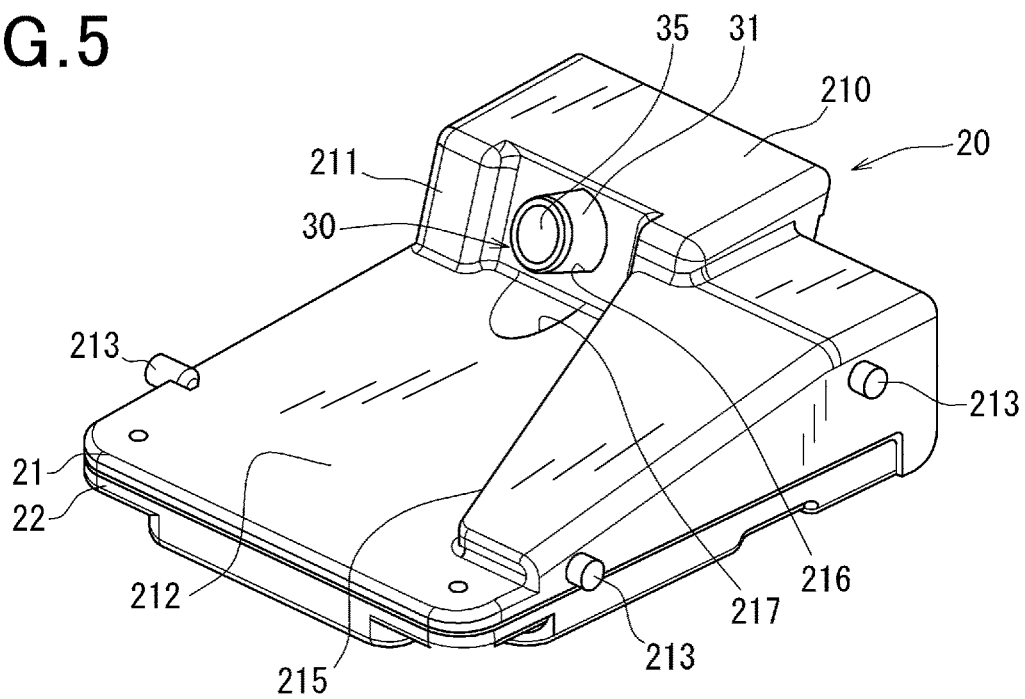
FIG. 5 is a perspective view which illustrates an upper surface of a camera casing and an optical assembly according to the first embodiment.

The bent wall portion 211 is, as can be seen in FIGS. 2 and 5, bent downward from the windshield-facing wall portion 210. The bent wall portion 211 defines a ridge along with the windshield-facing wall portion 210. The ridge extends over a substantially entire width of the upper casing member 21 in the lateral direction and is located close to the front windshield 3.

The recessed wall portion 212 extends at a given angle (excluding zero) to the bent wall portion 211. The recessed wall portion 212 is oriented to have an interval between itself and the front windshield 3 which decreases frontward from the bent wall portion 211. In other words, the recessed wall portion 212 extends from the bent wall portion 211 so as to approach the windshield 3. The recessed wall portion 212 defines the storage recess 215 (i.e., a chamber) between itself and the front windshield 3 in which the hood 40 is arranged.

The saucer-shaped lower casing member 22 is disposed beneath the upper casing member 21 with an upper opening facing the upper casing member 21. The lower casing member 22 is attached to the upper casing member 21 using screws. The casing members 21 and 22 define therein the storage chamber 25 in which the optical assembly 30 and the circuit unit 50 are disposed.

The optical assembly 30, as illustrated in FIGS. 2 to 7, includes the assembly holder 30a, the lens holder 31, the lens set 35, and the imager 34. The assembly holder 30a is made of an easy-to-machine hard material, such as resin, in a hollow block shape as a whole. The assembly holder 30a and the lens holder 31 define the optical path chamber 39 through which an optical image is directed to the imager 34.

The lens holder 31 is made of an easy-to-machine hard material, such as resin, in a hollow cylindrical form as a whole. The lens holder 31, as can be seen in FIGS. 2 and 5, may be joined to the upper casing member 21 of the camera casing 20 using adhesive. The lens holder 31 may alternatively be retained by the assembly holder 30a fastened to the upper casing member 21 using screws.

The lens holder 31, as illustrated in FIG. 2, has defined therein the optical path chamber 39 through which an optical image is directed using the lens set 35 disposed therein. The lens holder 31 has a front end exposed outside the camera casing 20 through the bent wall portion 211. Specifically, the bent wall portion 211, as illustrated in FIGS. 2 and 5, has the lens window 216 through which the front end of the lens holder 31 passes. The lens window 216 is formed by a through-hole passing through a thickness of the lateral center of the lens holder 31. The recessed wall portion 212 also has the recessed hole 217 formed in an upper surface thereof in the shape of a recess. The recessed hole 217 is located in the center of the recessed wall portion 212 in the width-wise direction thereof.

The lens set 35 shown in FIGS. 2 to 7 is made up of a plurality of lenses formed by a translucent material, such as glass. The lens set 35 is engineered to offer a relatively wide angle of view, for example, 75° to 150° to achieve an intended angle of view. The lens set 35 is also designed to have an f-number more than or equal to two in order to ensure given scene brightness and optical resolution. The lens set 35 is disposed in the lens holder 31 with each lens firmly retained by the lens holder 31. The lens set 35 has the optical axis Al which is slightly inclined upward or downward in the forward direction or extends straight in the longitudinal direction of the vehicle 2. The lens set 35 may alternatively be engineered to offer a wide angle of view larger than 150°.

The imager 34 shown in FIG. 2 is implemented by a color or back-and-white image sensor such as a CCD or a CMOS. The imager 34 may have an infrared cut-off filter (not shown) mounted in front of the image sensor. The imager 34 is of a rectangular plate shape as a whole. The imager 34 is mounted in the assembly holder 30a so that it is arranged inside the rear optical path chamber 39.

With the above arrangements of the optical assembly 30, light from the outside view 5 passing through the front windshield 3 enters the lens set 35 to form an image in the imager 34. Specifically, an optical image, as produced by light coming from an image capturing range in the outside view 5, is formed as an inverted image in the imager 34. The imager 34 takes the inverted image to output data, as derived by imaging the outside view 5, in the form of an electrical signal.

The hood 40 is, as illustrated in FIGS. 2 to 4, formed integrally with the bracket body 11 in resin molding. In other words, the hood 40 is made of a portion of the bracket assembly 10. As viewed from above the hood 40, an overall configuration thereof is of a disc shape symmetrical with respect to the optical axis Al of the lens set 35 in the lateral direction. The hood 40 includes the base wall 41, the rear end wall 42, and the side walls 43.

The base wall 41 is arranged above the recessed wall portion 212 and below the optical axis Al in front of the bent wall portion 211. The base wall 41 is disposed in the recessed storage chamber 215 between the recessed wall portion 212 and the front windshield 3. The base wall 41 extends forward in front of the bent wall portion 211 so as to close the distance to the front windshield 3. The base wall 41 is, therefore, shaped to have the bottom surface 41a (i.e., an upper surface) which is of a substantially flat trapezoidal shape and faces the inner surface 3a of the front windshield 3 through the imaging space 410. An optical image in a given image capturing range where the imager 34 works to capture an image of the outside view 5 passes through the front windshield 3 and then is directed to the imaging space 410.

The base wall 41, as illustrated in FIG. 2, has a plurality of optical block ribs 411 disposed thereon. The optical block ribs 411 protrude from the bottom surface 41a of the base wall 41 toward the front windshield 3, that is, the imaging space 410. Each of the optical block ribs 411 extends straight in the form of a convexity or ridge. Specifically, the optical block ribs 411 extend in the lateral direction and are arranged at a given interval away from each other in the longitudinal direction. Every adjacent two of the optical block ribs 411 have walls facing each other and work to achieve multiple reflection of light traveling to the base wall 41 between those walls, thereby trapping it. The height of each of the optical block ribs 411 from the base wall 41 is selected to be a given value achieving such optical trapping. FIGS. 3 and 4 omit the optical block ribs 411 for the brevity of illustration.

The rear end wall 42 is so arranged as to have a width in the lateral direction whose center line coincides with the optical axis Al. The rear end wall 42 extends upward from a rear edge of the base wall 41. The rear end wall 42 has the width broadening parallel to the bent wall portion 211 extending perpendicular to the optical axis Al. The rear end wall 42 has formed therein the lens window 420 which passes through a thickness thereof. The lens window 420 is located in the center of the width of the rear end wall 42. The front end portion of the lens holder 31 passes through the lens window 216 and the lens window 420 and is exposed to the imaging space 410 above the base wall 41. The optical axis Al is directed to the imaging space 410 corresponding to the image capturing range. The optical image of the outside view 5 in the image capturing range entering the imaging space 410 is, therefore, transmitted into the lens set 35 arranged on the optical axis Al.

The base wall 41 has the incident ray hole 421 formed in the center of the width of the bottom surface 41a in the lateral direction. The incident ray hole 421 is located near the exposed front portion of the lens holder 31 to communicate with the lens window 420. The recessed hole 217 formed in the recessed wall portion 212 is shaped to avoid physical interference with the incident ray hole 421. The incident ray hole 421 is formed to have a depth large enough to permit the optical image of the outside view 5 within the whole of the image capturing range to enter the lens set 35.

The side walls 43 are arranged symmetrically with respect to the optical axis Al in the lateral direction, so that they are located on opposite sides of the imaging space 410 in the lateral direction. The side walls 43 extend upward from right and left side edges of the base wall 41. Each of the side walls 43 is substantially perpendicular to the bottom surface 41a of the base wall 41, in other words, extends in the vertical direction. Each of the side walls 43 has the trapezoidal flat inner surface 43a. The interval between the inner surfaces 43a of the right and left side walls 43 in the lateral direction gradually increases toward the front of the base wall 41. Each of the side walls 43 has a height from the base wall 41 which decreases toward the front of the base wall 41, thereby creating, as clearly illustrated in FIG. 2, the air gap 430 between each of the side walls 43 and the inner surface 3a of the front windshield 3. The air gaps 430 extend over the whole of the camera module 1 in the longitudinal direction.

The hood 40 which has the above described structure serves to block input of unwanted light from outside the image capturing range in the outside view 5 into the lens set 35. For instance, the hood 40 blocks or minimizes the entry of light reflected by the inner surface 3a of the front windshield 3 into the lens set 35. The hood 40 also blocks light which is trapped by the optical block ribs 411 and then reflected on the base wall 41 into the lens set 35.

Figure 6:
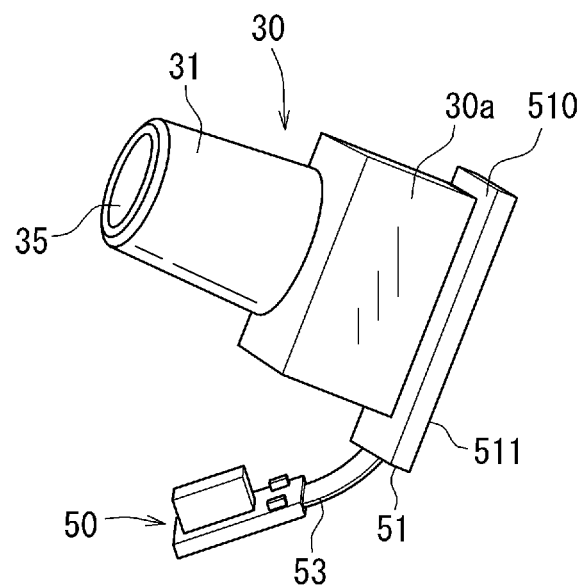
FIG. 6 is a perspective side view which illustrates an optical assembly and a circuit unit according to the first embodiment.
Figure 7:
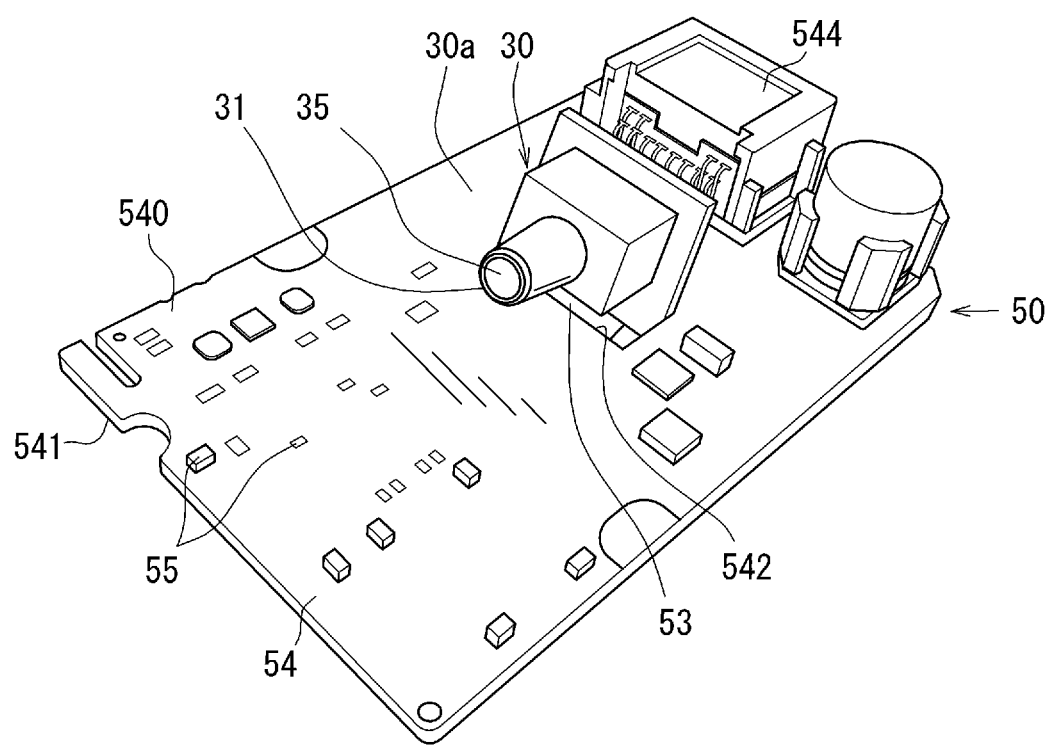
FIG. 7 is a perspective upper view which illustrates an optical assembly and a circuit unit according to the first embodiment.

The circuit unit 50 is, as illustrated in FIGS. 2, 6, and 7, positioned inside the storage chamber 25 along with components of the optical assembly 30. The circuit unit 50 is made of an assembly of the imaging substrate 51, the flexible substrate (FPC), and the controller substrate 54 and includes the imaging circuit 52 and the control circuit 55.

The imaging substrate 51 is, as illustrated in FIGS. 2 and 7, made of a rigid board, such as a glass epoxy board, and of a substantially rectangular flat plate. The imaging substrate 51 is secured to the rear end of the assembly holder 30a of the optical assembly 30 using adhesive, thereby closing the rear of the optical path chamber 39. The imaging substrate 51 has the front mount surface 510 exposed to the optical path chamber 39 and the rear mount surface 511 which is opposed to the front mount surface 510 through a thickness thereof. The rear mount surface 511 is exposed to the storage chamber 25. The front mount surface 510 has the imager 34 mounted thereon. The front and rear mount surfaces 510 and 511 have mounted thereon a plurality of circuit components which make up the imaging circuit 52. The imaging circuit 52 achieves transmission of signals or data between itself and the imager 34.

The FPC (i.e., flexible printed circuit) 53 is, as shown in FIGS. 2, 6, and 7, is made of, for example, a resinous flexible base film and conductors mounted thereon and of a substantially rectangular shape. The FPC 53 is connected at an end thereof to a lower end of the imaging substrate 51.

The control substrate 54 shown in FIGS. 2 and 7 is a rigid board, such as a glass epoxy board. The control substrate 54 is in the shape of a substantially rectangular plate. The control substrate 54 has an upper and a lower surface opposed to each other through a thickness thereof. The upper surface faces upward in the storage chamber 25, while the lower surface faces downward in the storage chamber 25. Specifically, the control substrate 54 has the upper mount surface 540 facing upward and the lower mount surface 541 facing downward. The control substrate 54 has an outer peripheral edge thereof and the upper mount surface 540 which are placed at a plurality of locations in contact with the upper casing member 21. The lower mount surface 541 is placed at a plurality of locations in contact with the lower casing member 22. This positions the control substrate 54 between the casing members 21 and 22. The control substrate 54 has the connecting hole 542 passing through the center of the width thereof and opening at the upper and lower mount surfaces 540 and 541. The connecting hole 542 is of a substantially rectangular shape and has the imaging substrate 51 and the lens holder 31 partially passing therethrough. In other words, the imaging substrate 51 and the lens holder 31 are arranged on both upper and lower sides of the control substrate 54.

The mount surfaces 540 and 541 have a plurality of circuit components making up the control circuit 55. The upper mount surface 540 has disposed thereon the external connector 544 exposed outside the camera casing 20. The external connector 544 is connected to an external circuit arranged outside the camera casing 20. For instance, the external connector 544 is connected to an ECU mounted outside the camera casing 20. The lower mount surface 541, as illustrated in FIG. 2, has disposed thereon the internal connector 543 exposed to the storage chamber 25. The internal connector 543 is connected to an end of the FPC 53 located below the control substrate 54, so that the control substrate 54 is connected to the imaging substrate 51 through the FPC 53 to achieve transmission of signals or data between the control circuit 55 and the imaging circuit 52.

Figure 8:
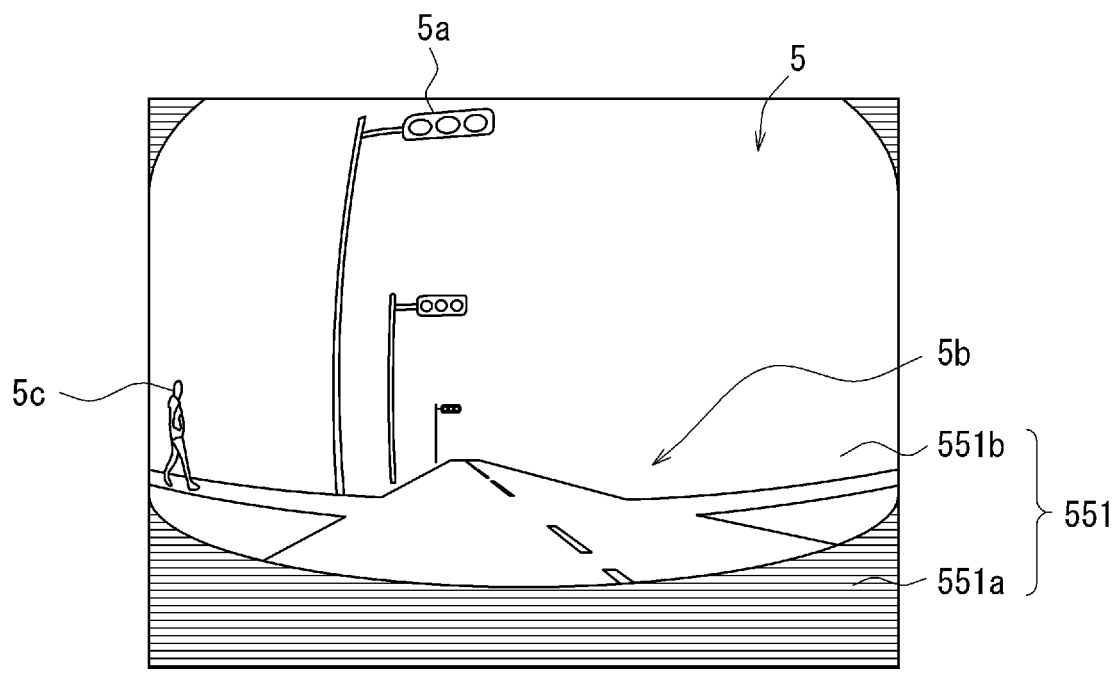
FIG. 8 is a schematic front view which demonstrates an outside view imaged by a camera module in the first embodiment.

The control circuit 55 has the microcomputer 550 mounted on the lower mount surface 541 as one of the circuit components. The microcomputer 550 includes a processor. The control circuit 55 works to process an image outputted from the imager 34 along with the imaging circuit 52 to produce the outside image 551 illustrated in FIG. 8. The outside image 551 in which a structural object and/or an obstacle can be identified within the image capturing range is produced. The image capturing range is, as demonstrated in FIG. 8, so selected that when the vehicle 2 has approached the traffic light 5a as a structural object above a roof panel of the vehicle 2, an image of the traffic light 5a can be identified in the outside image 551. The image capturing range is also so selected that when the front bumper of the vehicle 2 has approached the intersection 5b, an image of the front obstacle 5c, such as a pedestrian, a bicycle, or an automobile), entering the intersection 5b can be identified.

The control circuit 55 works along with the imaging circuit 52 to control imaging operations of the imager 34 including an exposure operation when the imager 34 takes an image. The control circuit 55 determines a range of effective pixels 551b, as demonstrated in FIG. 8, which is derived by removing from the outside image 551 produced by the image processing operations a range of the vehicle-image pixels 551a which is a lower portion of the outside image 551 and where a portion of the vehicle 2 (e.g., a bonnet or hood) appears in the outside image 551. The control circuit 55 controls the exposure used to capture an image next time as a function of pixel values of the effective pixels 551b in a given range. The pixel value used in such exposure control may be a gradation of only one or some of the effective pixels 551b.

The control circuit 55 may be designed to perform an image recognition operation to identify a structural object or an obstacle appearing within the image capturing range on the outside image 551 in addition to the above described image processing operation and imaging control operation. Either of the control circuit 55 or the imaging circuit 52 may be engineered to perform only one of the image processing operation and the imaging control operation.

The structure of the lens set 35 and the lens holder 31 of the optical assembly 30 will be described below in detail.

Figure 9:
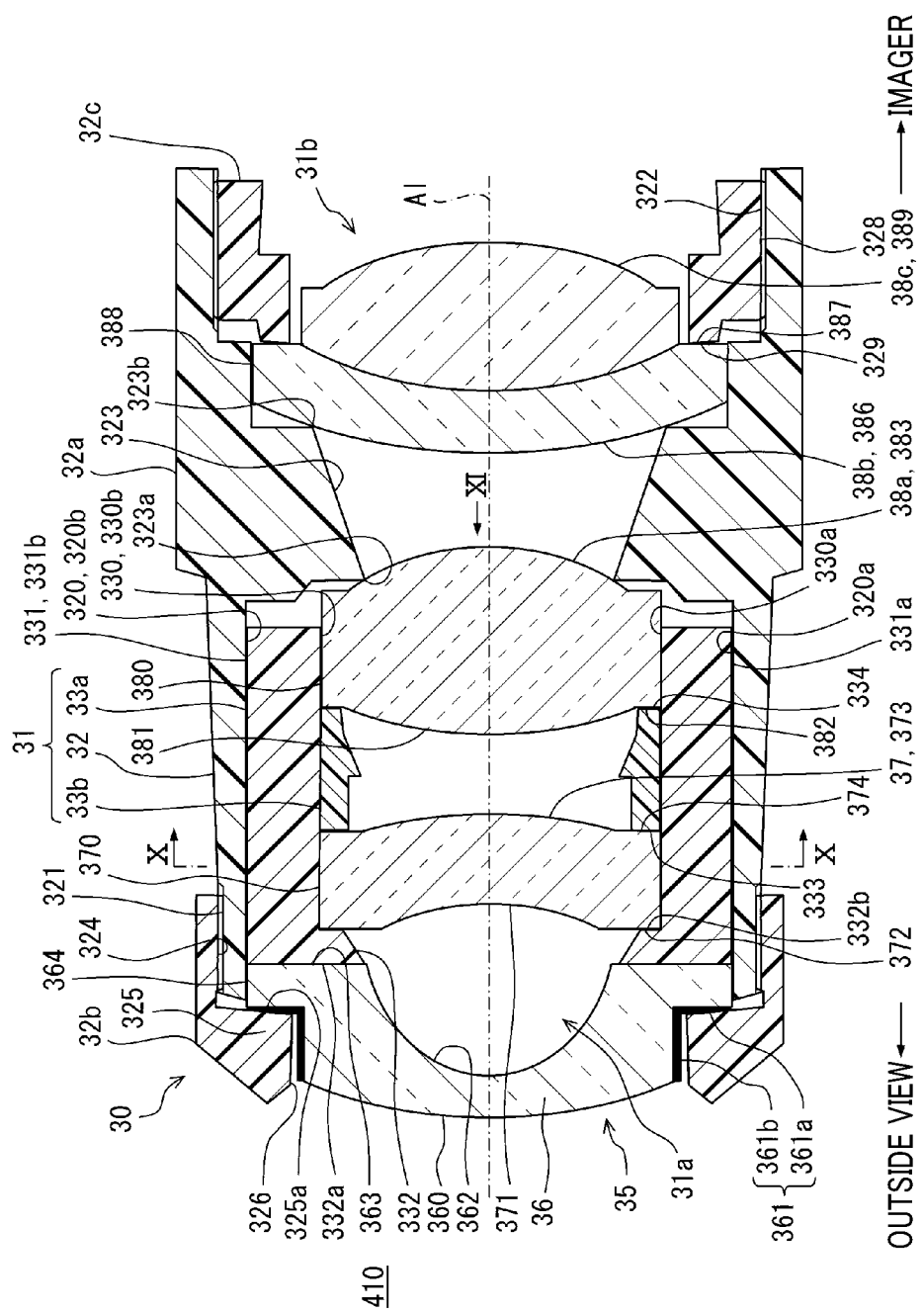
FIG. 9 is a longitudinal sectional view, as taken along the line IX-IX in FIG. 10, which illustrates a lens set and a lens barrel according to the first embodiment.

The lens set 35 is, as illustrated in FIG. 9, made as a 4-group 5-lens unit including the first lens 36 to the fifth lens 38c. The first lens 36 to the fifth lens 38c are arranged in this order from outside the lens set 35 toward the imager 34 and have axes aligned with each other. The optical axis Al of the lens set 35 is oriented to pass through the principal point of the first lens 36.

The first lens 36, the fourth lens 38b, and the fifth lens 38c of the lens set 35 are each made of a spherical lens shaped to have a spherical optical surface. The first lens 36 and the fourth lens 38b have outer diameters identical with each other. The second lens 37 and the third lens 38a are each made of an aspheric lens shaped to have an aspherical optical surface. The second lens 37 and the third lens 38a are smaller in diameter than the spherical lenses. The first lens 36, the second lens 37, and the third lens 38a are disposed in the first storage chamber 31a of the lens holder 31. The fourth lens 38b and the fifth lens 38c are disposed in the second storage chamber 31b of the lens holder 31.

The first lens 36 is shaped as a concave meniscus lens with the front convex surface 360 and the rear concave surface 362. Specifically, the first lens 36 is designed as a wide-angle lens offering the above described wide angle of view. The first lens 36 is fit in a front end of the lens barrel 321 to close the front of the optical path chamber 39. The front convex surface 360 is an optical surface which is located on the outermost side and exposed to the imaging space 410 through the lens opening 326. The first lens 36 has the step 361, the rear supporting surface 363, and the outer peripheral supporting surface 364 formed thereon.

The step 361 is formed in the front surface of the first lens 36 and located outside the front convex surface 360 in a radial direction of the first lens 36. The step 361 is shaped to provide a difference in outer diameter of the first lens 36. The step 361 includes the front supporting surface 361a (i.e., a tread) and the lens side surface 361b (i.e., a riser). Each of the front supporting surface 361a and the lens side surface 361b has a black light-shielding layer formed thereon. The front supporting surface 361a is of an annular shape with a flat face and oriented perpendicular to the optical axis Al. The lens side surface 361b is of a hollow cylindrical shape and arranged coaxially with the optical axis Al. The lens side surface 361b continuously leads to an inner edge of the front supporting surface 361a and an outer edge of the front convex surface 360. The lens side surface 361b faces an inner peripheral surface of the optical assembly 30 through an air gap in the radial direction of the optical assembly 30.

The rear supporting surface 363 is formed by a portion of the rear surface of the first lens 36 and located outside the rear concave surface 362 in the radial direction of the first lens 36. The rear supporting surface 363 is shaped as an annular flat surface which extends substantially perpendicular to the optical axis Al and faces the imager 34. The rear supporting surface 363 has an inner edge located inside the inner edge of the front supporting surface 361a in the radial direction of the first lens 36. The outer peripheral supporting surface 364 is of a hollow cylindrical shape and arranged coaxially with the optical axis Al. The outer peripheral supporting surface 364 continuously leads to the front supporting surface 361a and the rear supporting surface 363.

The second lens 37 is located closer to the imager 34 than the first lens 36 is. The second lens 37 is shaped as a concave meniscus lens with the front concave surface 371 and the rear convex surface 373. The second lens 37 is arranged away from the first lens 36 in the axial direction of the optical assembly 30. In other words, the second lens 37 is a lens discrete from the first lens 36 and firmly retained by an axial force. The second lens 37 has the outer peripheral supporting surface 370, the front supporting surface 372, and the rear supporting surface 374.

The outer peripheral supporting surface 370 is formed on an edge surface of the second lens 37. The outer peripheral supporting surface 370 is shaped as a hollow cylindrical surface arranged coaxially with the optical axis Al. The outer peripheral supporting surface 370 continuously leads to outer edges of the front supporting surface 372 and the rear supporting surface 374. The front supporting surface 372 is formed by a portion of the front surface of the second lens 37 and arranged outside the front concave surface 371 in the radial direction of the second lens 37. The front supporting surface 372 is shaped as an annular flat surface extending perpendicular to the optical axis Al and faces the outside view. The rear supporting surface 374 is formed by a portion of the rear surface of the second lens 37 and arranged outside the rear convex surface 373 in the radial direction of the second lens 37. The rear supporting surface 374 is formed as an annular surface which extends substantially perpendicular to the optical axis Al and faces the imager 34.

The third lens 38a is shaped to have major opposed convex surfaces: the front convex surface 381 and the rear convex surface 383. The third lens 38a has the outer peripheral supporting surface 380 and the front supporting surface 382 formed thereon. The outer peripheral supporting surface 380 is formed on an edge surface of the third lens 38a. The outer peripheral supporting surface 380 is shaped as a hollow cylindrical surface arranged coaxially with the optical axis Al. The outer peripheral supporting surface 380 continuously leads to an outer edge of the front supporting surface 382. The front supporting surface 382 is formed by a portion of the front surface of the third lens 38a and arranged outside the front convex surface 381 in the radial direction of the third lens 38a. The front supporting surface 382 is shaped as an annular flat surface which extends substantially perpendicular to the optical axis Al and faces the outside view.

The fourth lens 38b and the fifth lens 38c are joined or adhered together in the form of a single lens. The fourth lens 38b is shaped as a concave meniscus lens with the front convex surface 386. The fifth lens 38c is shaped to have major opposed convex surfaces one of which is the rear convex surface 389. The fourth lens 38b has the rear supporting surface 387 and the outer peripheral supporting surface 388 formed thereon. The rear supporting surface 387 is formed by a portion of the rear surface of the fourth lens 38b and arranged outside a joined interface between the fourth lens 38b and the fifth lens 38c in the radial direction of the fourth lens 38b. The rear supporting surface 387 is shaped as an annular flat surface which extends substantially perpendicular to the optical axis Al and faces the imager 34. The outer peripheral supporting surface 388 is formed on an edge surface of the fourth lens 38b. The outer peripheral supporting surface 388 is shaped as a hollow cylindrical surface arranged coaxially with the optical axis Al. The outer peripheral supporting surface 388 continuously leads to outer edges of the front convex surface 386 and the rear supporting surface 387.

The lens holder 31, as illustrated in FIGS. 9 to 13, includes the lens barrel 32, the main spacer 33a, and the sub-spacer 33b which are made of the same hard material.

The lens barrel 32 is made of an assembly of the lens barrel body 32a, the front cap 32b, and the rear bracket 32c. The front cap 32b and the rear bracket 32c are attached to the lens barrel body 32a. The lens barrel 32 defines the first storage chamber 31a and the second storage chamber 31b in which the lens set 35, the main spacer 33a, and the sub-spacer 33b are disposed. The first storage chamber 31a and the second storage chamber 31b constitute a portion of the optical path chamber 39.

Figure 10:
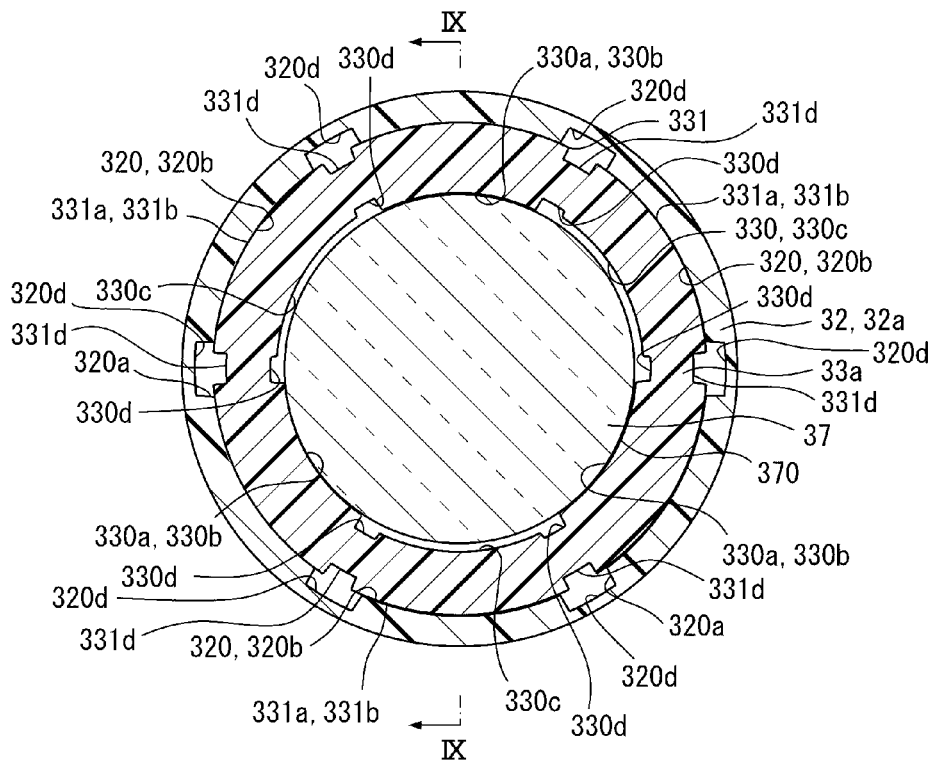
FIG. 10 is a transverse sectional view, as taken along the line X-X in FIG. 9, which illustrates a lens set and a lens barrel according to the first embodiment.
Figure 11:
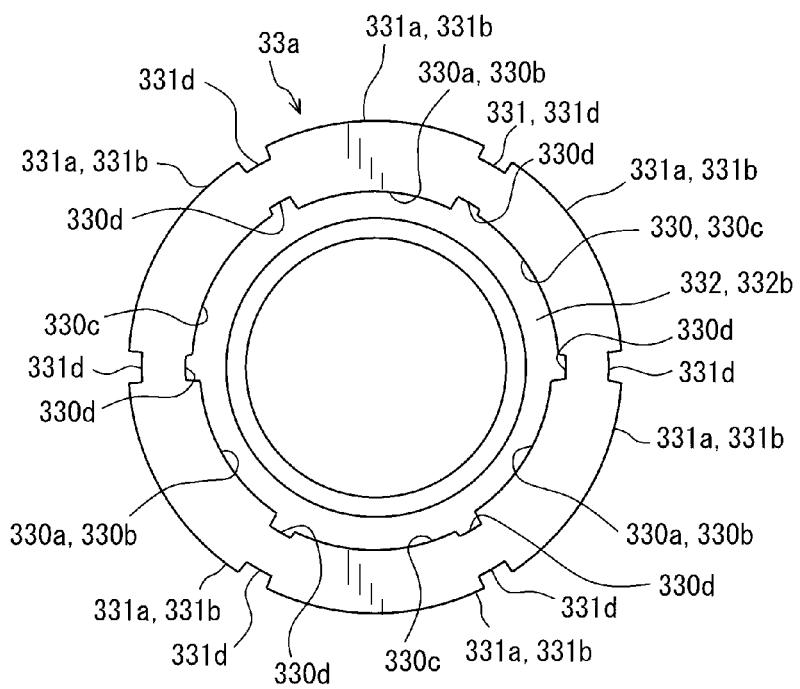
FIG. 11 is a plan view which illustrates a main spacer, as viewed in a direction indicated by an arrow XI in FIG. 9, according to the first embodiment.

The lens barrel body 32a is shaped to be cylindrical as a whole and retains an outer periphery of the first lens 36 (see FIG. 10). The lens barrel body 32a has an inner peripheral wall (which will also be referred to as the lens barrel inner peripheral wall 320) which defines the first storage chamber 31a. The lens barrel inner peripheral wall 320 is equipped with a plurality of (six in this embodiment) lens barrel protrusions 320a. Each of the lens barrel protrusions 320a is shaped to protrude from the bases 320d of the lens barrel inner peripheral wall 320 inwardly in the radial direction of the lens barrel inner peripheral wall 320. The bases 320d of the lens barrel inner peripheral wall 320 also serve as bases of the lens barrel protrusions 320a. A bottom of a groove created between every adjacent two of the lens barrel protrusions 320a defines the base 320d. The lens barrel protrusions 320a are arranged at equal angular intervals away from each other in the circumferential direction of the lens barrel body 32a. The lens barrel protrusions 320a extend from the rear end to the front end of the first storage chamber 31a in the axial direction. Each of the lens barrel protrusions 320a has the inner cylindrical surface 320b which is of a partially cylindrical shape. A cylinder, as defined by the six inner cylindrical surface 320b, has an inner diameter substantially identical with an outer diameter of the main spacer 33a and an outer diameter of the outer peripheral supporting surface 364 of the first lens 36. The lens barrel protrusions 320a retain the outer periphery of the main spacer 33a on the inner cylindrical surfaces 320b. The lens barrel protrusions 320a also retain the outer peripheral supporting surface 364 of the first lens 36 on front portions of the inner cylindrical surfaces 320b.

The lens barrel body 32a includes the front fitting portion 321, the rear fitting portion 322, and the dividing wall 323. The front fitting portion 321 is formed by an outer peripheral wall of a front portion of the lens barrel body 32a facing the outside view. The front fitting portion 321 has, for example, an external thread engaging the front cap 32b. The rear fitting portion 322 is formed by an inner peripheral wall of a base end portion of the lens barrel body 32a facing the imager 34. The rear fitting portion 322 has, for example, an internal thread engaging the rear bracket 32c.

The dividing wall 323 is made of a cylindrical wall extending from the inner periphery of the lens barrel body 32a inwardly in the radial direction of the lens barrel body 32a. The dividing wall 323 defines or isolates the first storage chamber 31a and the second storage chamber 31b from each other within the lens barrel body 32a. The dividing wall 323 has a front surface which faces the outside view and has an inner edge serving as the front support 323a. The dividing wall 323 also has a rear surface which faces the imager 34 and has an inner edge serving as the rear support 323b. The front support 323a is placed in annular line-contact with an outer edge portion of the third lens 38a to stop the third lens 38a from moving toward the imager 34. The rear support 323b is placed in annular line contact with an outer edge portion of the front convex surface 386 of the fourth lens 38b to stop the fourth lens 38b from moving toward the outside view.

The front cap 32b is of a flat cylindrical shape with a bottom as a whole. The front cap 32b is retained by the lens barrel body 32a and exerts the axial force Fax1 (see FIG. 13) on the first lens 36 of the lens set 35 in a direction of the optical axis Al. The front cap 32b has the front fitting portion 324, the lens opening 326, and the lens barrel axial force applying portion 325.

The front fitting portion 324 is formed by an inner periphery of a cylindrical wall of the front cap 32b and has, for example, an internal thread engaging the front fitting portion 321. The lens opening 326 is of a true circle shape and formed in a radial center portion of a bottom wall of the front cap 32b coaxially with the front cap 32b. The lens opening 326 serves as a transmissive window through which light reaches the lens set 35. The lens barrel axial force applying portion 325 is of a flange shape and protrudes from the cylindrical wall of the front cap 32b inwardly in the radial direction of the front cap 32b. The lens barrel axial force applying portion 325 has the annular front axial force-applying surface 325a facing the imager 34. The lens barrel axial force applying portion 325 threadedly engages the front fitting portion 321 of the front fitting portion 324, thereby placing the front axial force-applying surface 325a in contact with the first lens 36.

The rear bracket 32c is of a flat cylindrical shape as a whole. The rear bracket 32c is retained by the lens barrel body 32a to exert the axial force Fax2 (see FIG. 13) on the fourth lens 38b of the lens set 35 in the direction of the optical axis Al. The axial force Fax2, as produced by the rear bracket 32c, is oriented in a direction opposite that in which the axial force Fax1 produced by the front cap 32b is oriented. The rear bracket 32c has the rear fitting portion 328 and the rear axial force-applying surface 329.

The rear fitting portion 328 is formed on an outer periphery of a cylindrical wall of the rear bracket 32c and has, for example, an external thread engaging the rear fitting portion 322. The rear axial force-applying surface 329 is formed by an annular front end surface of the rear bracket 32c which faces the outside view. The rear axial force-applying surface 329 threadedly engages the rear fitting portion 322 of the rear fitting portion 328, so that it contacts the rear supporting surface 387 of the fourth lens 38b.

The main spacer 33a is of a hollow cylindrical shape as a whole. The main spacer 33a is disposed in the lens barrel 32 coaxially therewith. The main spacer 33a has the second lens 37, the third lens 38a, and the sub-spacer 33b disposed therein. The main spacer 33a has an inner wall (which will also be referred to below as the spacer inner peripheral wall 330 retaining be second lens 37, the third lens 38a, and the sub-spacer 33b) which has a plurality of (three in this embodiment) inner convex portions 330a and a plurality of (three in this embodiment) intermediate convex portions 330c formed thereon (see FIG. 11).

The inner convex portions 330a and the intermediate convex portions 330c are shaped to protrude from the bases 330d of the spacer inner peripheral wall 330 inwardly in the radial direction of the main spacer 33a. The bases 330d of the spacer inner peripheral wall 330 serve as bases of the inner convex portions 330a and the intermediate convex portions 330c. A bottom of a groove created between an adjacent two of the inner convex portions 330a and the intermediate convex portions 330c defines the base 330d. The inner convex portions 330a and the intermediate convex portions 330c are alternately arranged at equal interval away from each other in the circumferential direction of the main spacer 33a. The inner convex portions 330a and the intermediate convex portions 330c extend from the rear edge to the front edge of the spacer inner peripheral wall 330 in the axial direction. The inner convex portions 330a have the inner peripheral cylindrical surfaces 330b of a partially cylindrical shape. A cylinder, as defined by the three inner peripheral cylindrical surfaces 330b, has an inner diameter identical with the outer diameters of the outer peripheral supporting surfaces 370 and 380 of the second lens 37 and the third lens 38a and the outer diameter of the sub-spacer 33b. The inner convex portions 330a retain outer peripheries of the second lens 37, the third lens 38a, and the sub-spacer 33b on the inner peripheral cylindrical surfaces 330b. A cylinder, as defined by inner peripheral surfaces of the intermediate convex portions 330c, has an inner diameter slightly larger than inner diameters of the inner convex portions 330a and the outer diameters of the outer peripheral supporting surfaces 370 and 380. The intermediate convex portions 330c are, therefore, placed in non-contact with the outer peripheral supporting surfaces 370 and 380 and the sub-spacer 33b.

The main spacer 33a has an outer peripheral wall (which will also be referred to below as the spacer outer peripheral wall 331) which has a plurality of (six in this embodiment) the outer convex portions 331a formed thereon. The outer convex portions 331a are shaped to protrude from the bases 331d of the spacer outer peripheral wall 331 outward in the radial direction of the main spacer 33a. The bases 331d of the spacer outer peripheral wall 331 also serve as bases of the outer convex portions 331a. A bottom of a groove between an adjacent two of the outer convex portions 331a defines the base 331d. The outer convex portions 331a are arranged at equal intervals away from each other in the circumferential direction of the main spacer 33a. The outer convex portions 331a are shaped to extend from the rear edge to the front edges of the spacer outer peripheral wall 331 in the axial direction of main spacer 33a. The outer convex portions 331a each have the outer peripheral cylindrical surface 331b of a partial cylindrical shape. A cylinder, as defined by the six outer peripheral cylindrical surfaces 331b, has an outer diameter substantially identical with the inner diameter of the inner cylindrical surface 320b of the lens barrel body 32a. When the main spacer 33a is inserted into the lens barrel body 32a, the outer convex portions 331a, therefore, have the outer peripheral cylindrical surfaces 331b placed in close contact with inner cylindrical surface 320b of the lens barrel inner peripheral wall 320. The main spacer 33a is, therefore, fit in the lens barrel body 32a and retained by the lens barrel inner peripheral wall 320.

The main spacer 33a also has the axial force-transmitting portion 332. The axial force-transmitting portion 332 is formed in an inward-extending flange shape on an axial end of the main spacer 33a facing the outside view. The axial force-transmitting portion 332 is placed in contact with the rear supporting surface 363 of the first lens 36 and protrudes inside the outer peripheral supporting surface 370 of the second lens 37 in the radial direction of the main spacer 33a. The axial force-transmitting portion 332 is of an annular shape and arranged coaxially with the main spacer 33a and includes the first axial force-applying surface 332a and the second axial force-applying surface 332b. The first axial force-applying surface 332a is defined by an annular front end surface of the main spacer 33a which is oriented toward the outside view and faces the front axial force-applying surface 325a in the axial direction of the main spacer 33a. The first axial force-applying surface 332a is placed in annular contact with the rear concave surface 362 of the first lens 36. The second axial force-applying surface 332b is defined by a rear end surface of the flange (i.e., the axial force-transmitting portion 332) which faces the imager 34 and faces the end surface of the sub-spacer 33b in the axial direction of the main spacer 33a. The whole of the second axial force-applying surface 332b is located inside the front axial force-applying surface 325a and the front supporting surface 361a in the radial direction of the main spacer 33a. The second axial force-applying surface 332b is placed in annular surface contact with the front supporting surface 372 of the second lens 37. The axial force-transmitting portion 332 is arranged between the second lens 37 and the first lens 36 and works to transmit the axial force Fax1 from one of the first lens 36 and the second lens 37 to the other.

The sub-spacer 33b is of a cylindrical shape as a whole. The sub-spacer 33b is arranged inside the main spacer 33a coaxially therewith. The sub-spacer 33b is located between the second lens 37 and the third lens 38a. The sub-spacer 33b has the front axial force-applying end surface 333 and the rear axial force-applying end surface 334.

The front axial force-applying end surface 333 is defined by a front annular end of the sub-spacer 33b which faces the outside view. The front axial force-applying end surface 333 faces the second axial force-applying surface 332b in the axial direction of the sub-spacer 33b. The front axial force-applying end surface 333 is placed in annular contact with the rear supporting surface 374 of the second lens 37. The rear axial force-applying end surface 334 is defined by a rear annular end of the sub-spacer 33b which faces the imager 34. The rear axial force-applying end surface 334 faces the front support 323a of the dividing wall 323 in the axial direction. The rear axial force-applying end surface 334 is placed in annular contact with the front supporting surface 382 of the third lens 38a. The sub-spacer 33b is disposed between the second lens 37 and the third lens 38a and works to supply the axial force Fax1 from one of the second lens 37 and the third lens 38a to the other.

Figure 12:
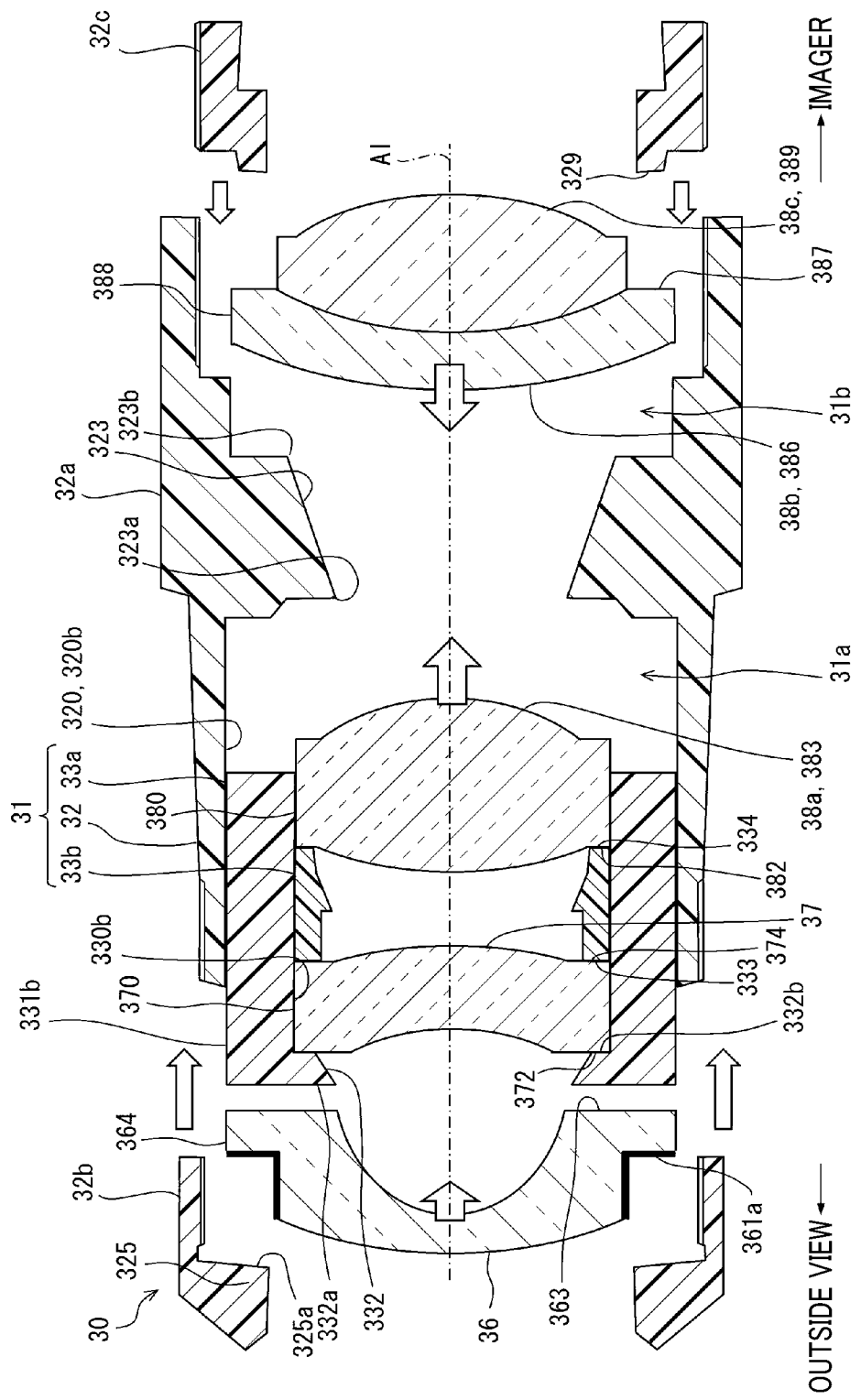
FIG. 12 is a longitudinal sectional view which demonstrate how to assemble a lens set and a lens barrel according to the first embodiment.
Figure 13:
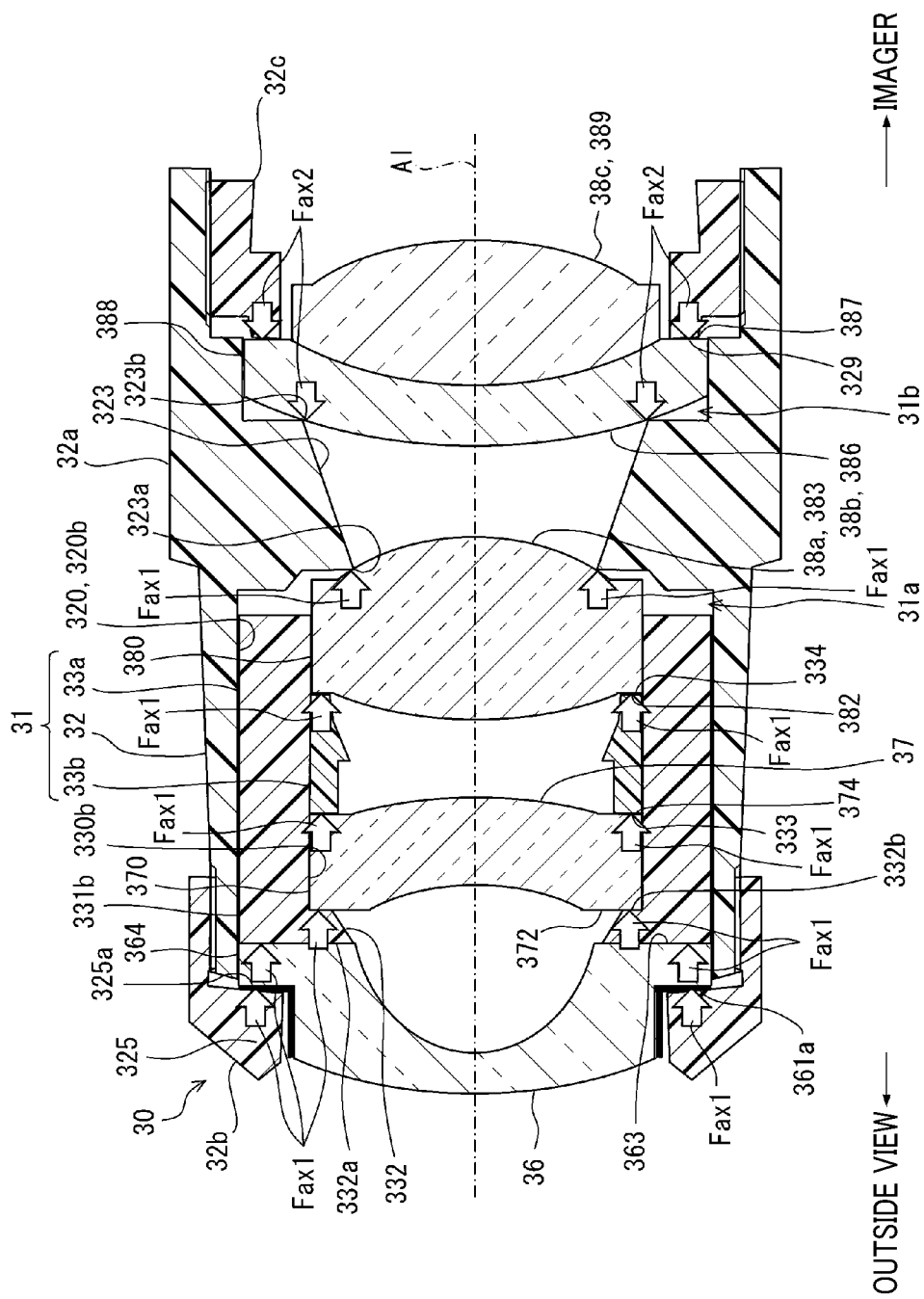
FIG. 13 is a longitudinal sectional view which demonstrates axial forces acting on a lens set and a lens barrel according to the first embodiment.

How to install the lens set 35 in the lens holder 31 and the axial forces Fax1 and Fax2 resulting from the installation of the lens set 35 will be described below in detail with reference to FIGS. 12 and 13.

First, the second lens 37, the sub-spacer 33b, and the third lens 38a are fitted into the main spacer 33a in this order. The second lens 37 and the third lens 38a are, therefore, retained at the outer peripheral supporting surfaces 370 and 380 thereof by the inner peripheral cylindrical surfaces 330b. The main spacer 33a in which the second lens 37 and the third lens 38a are disposed is fit in the first storage chamber 31a of the lens barrel body 32a with the rear convex surface 383 of the third lens 38a oriented to face the imager 34. The main spacer 33a is, therefore, retained at the outer peripheral cylindrical surfaces 331b thereof by the inner cylindrical surface 320b of the lens barrel 32.

After the installation of the main spacer 33a, the first lens 36 is fit in the lens barrel body 32a. The first lens 36 is retained at the outer peripheral supporting surface 364 thereof by a front portion of the inner cylindrical surface 320b. After the main spacer 33a and the first lens 36 are fitted into the first storage chamber 31a in this order, the front cap 32b is attached to the lens barrel body 32a. The first cap 32b retained by the lens barrel body 32a brings the front axial force-applying surface 325a of the lens barrel axial force applying portion 325 into close contact with the front supporting surface 361a of the first lens 36, thereby exerting the axial force Fax1 on the front supporting surface 361a.

The axial force Fax1 works to urge the rear supporting surface 363 of the first lens 36 into annular contact with the first axial force-applying surface 332a of the main spacer 33a, thereby causing the axial force Fax1, as produced by the front cap 32b, to be applied to the axial force-transmitting portion 332. The first lens 36 is, therefore, firmly held or nipped between the lens barrel axial force applying portion 325 and the first axial force-applying surface 332a, in other words, retained by the lens barrel 32 using the axial force Fax1.

The application of the axial force Fax1 to the axial force-transmitting portion 332 also urges the second axial force-applying surface 332b of the axial force-transmitting portion 332 into annular contact with the front supporting surface 372 of the second lens 37, thereby exerting the axial force Fax1, as transmitted from the first lens 36, on the front supporting surface 372. This causes the axial force Fax1 to be applied from the rear supporting surface 374 of the second lens 37 to the front axial force-applying end surface 333 of the sub-spacer 33b and also from the rear axial force-applying end surface 334 of the sub-spacer 33b to the front supporting surface 382 of the third lens 38a. This presses the third lens 38a at the rear convex surface 383 thereof against the front support 323a.

As apparent from the above discussion, the second lens 37 and the third lens 38a hold the sub-spacer 33b therebetween and are firmly retained between the axial force-transmitting portion 332 and the front support 323a, so that it is supported by the lens barrel 32 using the axial force Fax1. In this way, the first lens 36, the second lens 37, and the third lens 38a are firmly fixed or positioned relative to each other along the optical axis Al.

The fourth lens 38b and the fifth lens 38c attached to each other as a lens unit is fitted into the second storage chamber 31b of the lens barrel body 32a with the front convex surface 386 oriented to face the outside view. The fourth lens 38b is, therefore, retained at the outer peripheral supporting surface 388 thereof by the inner periphery of the lens barrel body 32a. The fitting of the rear bracket 32c into the lens barrel body 32a urges the rear axial force-applying surface 329 of the rear bracket 32c into contact with the rear supporting surface 387 of the fourth lens 38b, thereby exerting the axial force Fax2 on the rear supporting surface 387.

The application of the axial force Fax2 to the rear supporting surface 387 causes the front convex surface 386 of the fourth lens 38b to be pressed against the rear support 323b of the dividing wall 323, thereby firmly holding the fourth lens 38b between the rear bracket 32c and the dividing wall 323. In other words, the fourth lens 38b is firmly retained by the lens barrel 32 using the axial force Fax2. In this way, the fourth lens 38b and the fifth lens 38c are firmly fixed or positioned relative to the lenses 36, 37, and 38a along the optical axis Al.

As apparent from the above discussion, the second lens 37 in the first embodiment is disposed within the main spacer 33a and is smaller in diameter than the first lens 36. The axial force-transmitting portion 332 which is arranged between the first lens 36 and the second lens 37 functions to achieve transmission of the axial force Fax1 between the first lens 36 and the second lens 37. This achieves application of axial force Fax1 both to the first lens 36 and to the second lens 37 although they are different in diameter from each other. The above described structure of the optical assembly 30, therefore, ensures the stability in firmly holding or retaining the first lens 36 and the second lens 37 in the lens barrel 32 at design locations with high accuracy regardless of conditions of installation thereof in the vehicle 2 and also enables the second lens 37 to be reduced in size without sacrificing required optical ability thereof.

The first lens 36 in the first embodiment, as described above, has the step 61 formed outside the front convex surface 360 in the radial direction of the first lens 36. The lens barrel 32 is shaped to have the lens barrel axial force applying portion 325 which retains the step 361 using the axial force Fax1. In other words, such a structure of the lens barrel 32 creates a chamber which is defined by a recessed shape of the step 361 and in which the lens barrel axial force applying portion 325 is disposed. This enables a front end portion of the lens barrel 32 near the first lens 36 to be reduced in size, thereby enabling the front convex surface 360 of the first lens 36 (see FIGS. 14(a) and 14(b)) to have a diameter large enough to offer a required wide angle of view and also enabling the front end diameter d1 of the lens barrel 32 to be minimized. This results in a decrease in size of the lens barrel 32 without sacrificing a required level of optical ability of the optical assembly 30.

Figure 14A:
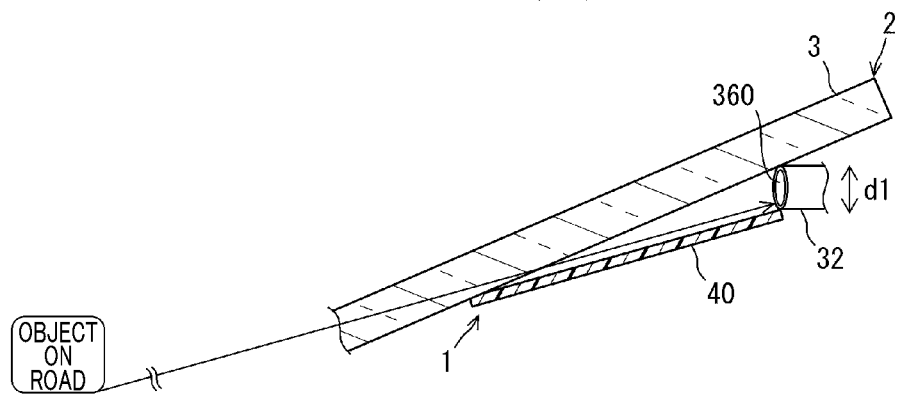
FIG. 14(*a*) is a partially sectional view which illustrates a front end portion of a lens barrel which has a decreased diameter.
Figure 14B:
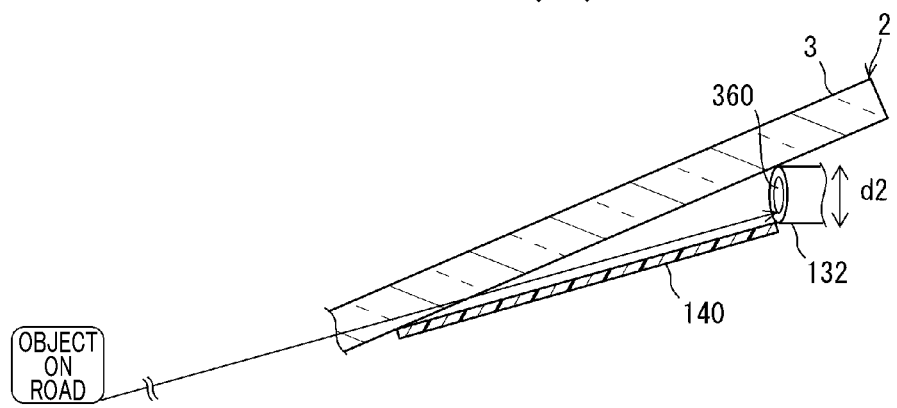

The decrease in size of the front end portion of the lens barrel 32, as can be seen in FIG. 14(a), enables the hood 40 to be reduced in size. Specifically, the camera module 1 is designed to have the hood 40 oriented at a given angle to the horizontal plane (e.g., the road surface) in order to obtain a lower angle of view to capture an image of an object at a specific position on the road surface relative to the vehicle 2. If the large-sized lens barrel 132 is used, it will result in an increased interval between the front windshield 3 and the hood 140 due to the large diameter d2 of the lens barrel 132 (d2>d1), thereby leading to the need for increasing the length or size of the hood 140.

In contrast, the small-sized lens barrel 32 in the first embodiment is enabled to have the hood 40 arranged close to the front windshield 3, thereby enabling the length of the hood 40 in the longitudinal direction to be decreased by more than a decrease in size or diameter of the lens barrel 32. The decrease in diameter of the lens barrel 32, therefore, enables the hood 40, i.e., the camera module 1 to be reduced in size thereof.

The whole of the step 361 is located outside the front supporting surface 372 of the second lens 37 in the radial direction, thus resulting in a large deviation of a location where the axial force Fax1 acts on the step 361 from the lenses 36 and 37 in the radial direction. In order to alleviate such a problem, the axial force-transmitting portion 332 of the main spacer 33a is shaped to extend inside the outer peripheral supporting surface 370 in the radial direction in contact with the first lens 36 and thus functions to transmit the axial force Fax1 from radially outside the second lens 37 to the front supporting surface 372. Accordingly, the axial force-transmitting portion 332 shaped to have the inwardly extending flange is capable of transmitting the axial force Fax1 both to the first lens 36 and to the second lens 37 which are different in diameter from each other.

The three inner convex portions 330a of the spacer inner peripheral wall 330 serve to position the second lens 37 in the radial direction thereof on the inner peripheral cylindrical surfaces 330b. Usually, it is easier to ensure the circularity of the inner peripheral cylindrical surfaces 330b than that of the whole of the spacer inner peripheral wall 330. The use of the inner peripheral cylindrical surfaces 330b of the inner convex portions 330a to hold the second lens 37, therefore, facilitates the achievement of concentricity of the main spacer 33a and the second lens 37 as compared with use of the whole of the spacer inner peripheral wall 330. This easily achieves the alignment of the axes of the first lens 36 and the second lens 37.

The outer peripheral cylindrical surfaces 331b of the six outer convex portions 331a of the spacer outer peripheral wall 331 are retained by the lens barrel inner peripheral wall 320, thereby positioning the main spacer 33a in the radial direction thereof within the optical assembly 30. It is, like the spacer inner peripheral wall 330, easier to ensure the circularity of the outer peripheral cylindrical surfaces 331b than that of the whole of the spacer outer peripheral wall 331. The use of the lens barrel inner peripheral wall 320 to hold the outer peripheral cylindrical surfaces 331b of the outer convex portions 331a, therefore, facilitates the achievement of concentricity of the lens barrel 32 and the main spacer 33a. This ensures the stability in alignment of the axis of the second lens 37 with that of the first lens 36.

The six lens barrel protrusions 320a of the lens barrel inner peripheral wall 320 serve to position the main spacer 33a in the radial direction thereof on the inner cylindrical surface 320b. It is, like the main spacer 33a, easier to ensure the circularity of the inner cylindrical surfaces 320b of the lens barrel body 32a than that of the whole of the lens barrel inner peripheral wall 320. The use of the inner cylindrical surfaces 320b engaging the outer convex portions 331a to retain the main spacer 33a, therefore, facilitates the achievement of concentricity of the lens barrel 32 and the main spacer 33a. This ensures the stability in alignment of the axis of the second lens 37 with that of the first lens 36.

The lens barrel 32 in the first embodiment is, as described above, made by an assembly of the front cap 32b with the lens barrel axial force applying portion 325 and the lens barrel body 32a. Such a structure enables the axial force Fax1 to be exerted on the lenses of the lens set 35 both from the side of the imager 34 and from the side of the outside view. It is, thus, possible to minimize the magnitude of the axial force Fax1 acting on the first lens 36 and the second lens 37 of the lens set 35 in the optical assembly 30. This ensures the stability in retaining the first lens 36 and the second lens 37 using the axial force Fax1 regardless of a difference in diameter therebetween.

In this disclosure, the front windshield is also referred to as a windshield. The lens barrel body 32a is also referred to as a retainer body. The lens barrel inner peripheral wall 320 is also referred to as an inner peripheral wall of a lens barrel. The inner cylindrical surfaces 320b are also referred to as partial cylindrical surfaces. The front cap 32b is also referred to as an axial force-applying retainer. The main spacer 33a is also referred to as an inner lens barrel. The spacer inner peripheral wall 330 is also referred to as an inner peripheral wall of the inner lens barrel. The spacer outer peripheral wall 331 is also referred to as an outer peripheral wall of the inner lens barrel. The first lens 36 is also referred to as an outside view lens. The front convex surface 360 is also referred to as an optical surface. The second lens 37 is also referred to as a small-diameter lens. The outer peripheral supporting surface 370 is also referred to as an outer peripheral surface. The front supporting surface 372 is also referred to as a small-diameter contact surface.

Second Embodiment

Figure 15:
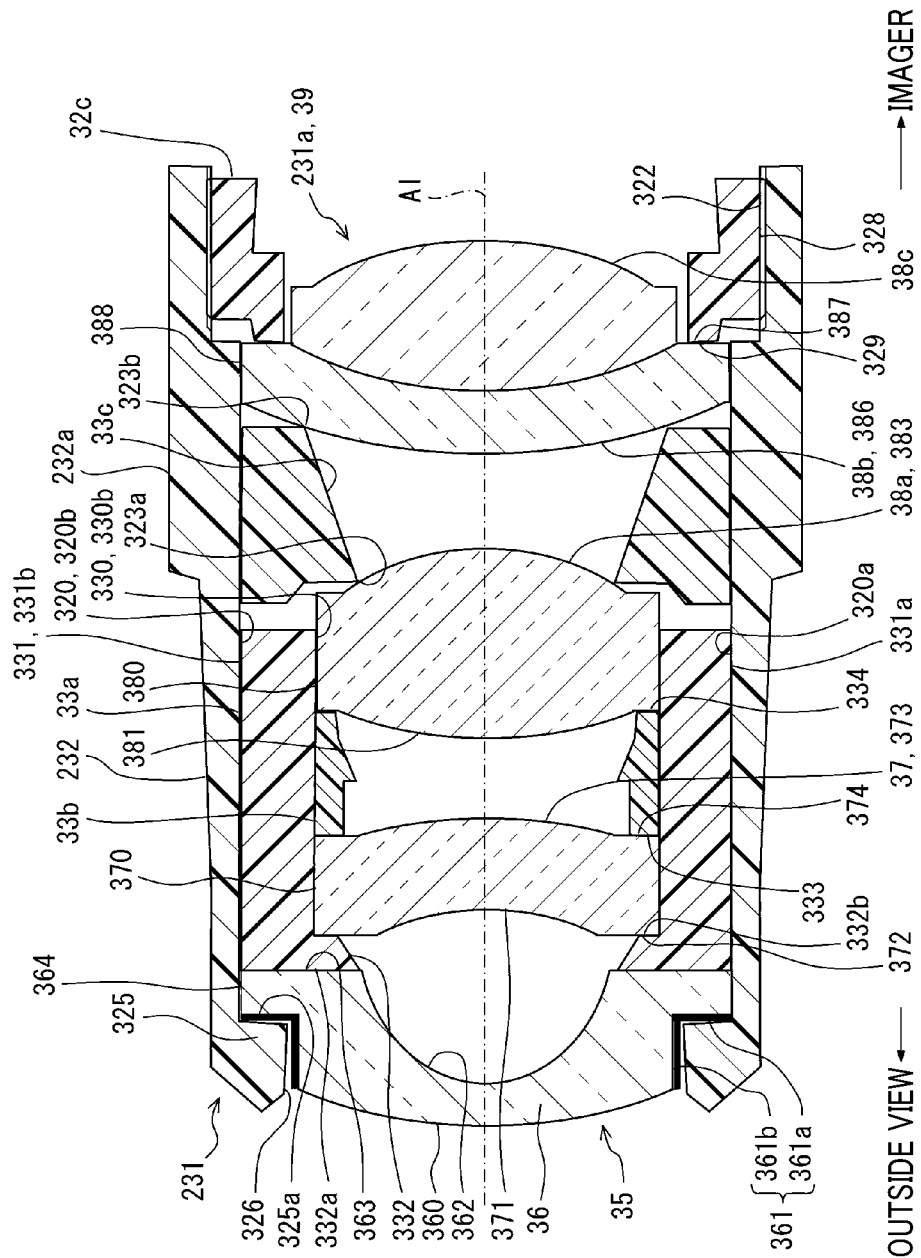
FIG. 15 is a longitudinal sectional view which illustrates a lens set and a lens barrel according to the second embodiment.
Figure 16:
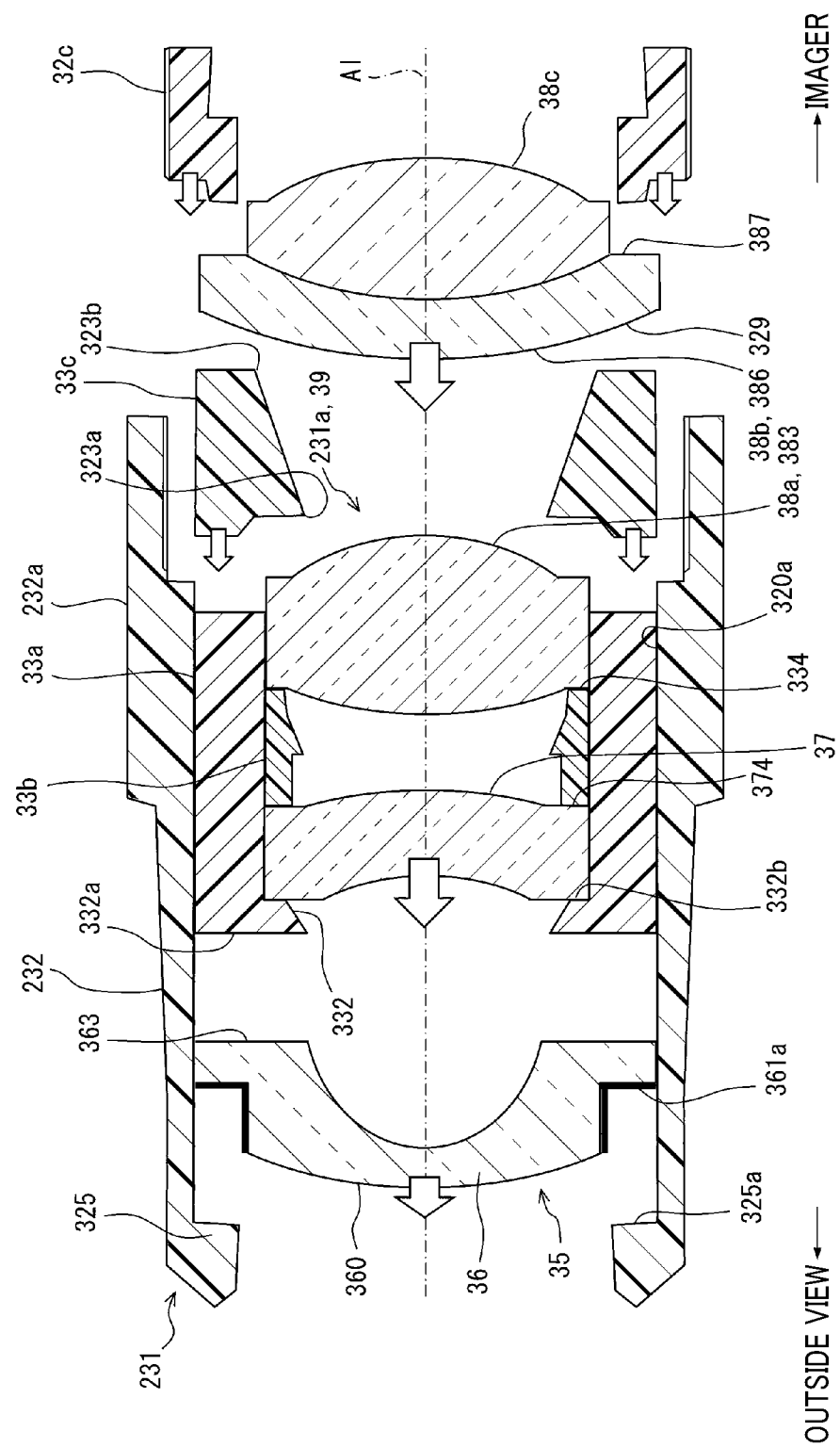
FIG. 16 is a longitudinal sectional view which demonstrate how to assemble a lens set and a lens barrel according to the second embodiment.

The second embodiment is, as can be seen in FIGS. 15 to 17, a modification of the first embodiment. The lens holder 231 in the second embodiment includes the intermediate spacer 33c and the lens barrel 232 in addition to the main spacer 33a and the sub-spacer 33b which are identical with those in the first embodiment.

The intermediate spacer 33c is of a hollow cylindrical shape as a whole. The intermediate spacer 33c is identical in outer diameter with the main spacer 33a and fit in the lens barrel inner peripheral wall 320. The intermediate spacer 33c is arranged in alignment with the main spacer 33a in the axial direction of the lens barrel inner peripheral wall 320. The intermediate spacer 33c is disposed between the third lens 38a and the fourth lens 38b to set an interval between the third lens 38a and the fourth lens 38b to a given value. The intermediate spacer 33c includes the front support 323a and the rear support 323b.

The lens barrel 232 is made of the rear bracket 32c fit in the lens barrel body 232a. The lens barrel 232 has the storage chamber 231a which is defined as a portion of the optical path chamber 39 and corresponds to the chambers 31a and 31b shown in FIG. 9 in the first embodiment.

The lens barrel body 232a is of a hollow cylindrical shape as a whole. The lens barrel inner peripheral wall 320 of the lens barrel body 232a has an inner diameter kept constant from a portion of the lens barrel body 232a retaining the outer peripheral supporting surface 388 of the fourth lens 38b to a portion of the lens barrel body 232a retaining the outer peripheral supporting surface 364 of the first lens 36. The lens barrel inner peripheral wall 320 has the lens barrel protrusions 320a formed thereon.

The lens barrel protrusions 320a has the inner cylindrical surfaces 320b fit on or around the first lens 36, the main spacer 33a, the intermediate spacer 33c, and the fourth lens 38b. The lens barrel body 232a has the lens barrel axial force applying portion 325 formed thereon in addition to the rear fitting portion 322 retaining the rear bracket 32c. The lens barrel axial force applying portion 325 is formed in the shape of a protrusion or flange which protrudes radially inwardly from the lens barrel inner peripheral wall 320. The lens barrel axial force applying portion 325 has the front axial force-applying surface 325a placed in contact with the front supporting surface 361a to hold the first lens 36 from moving toward the outside view.

How to install the lens set 35 in the lens holder 231 and the axial force Fax resulting from such installation will be described below.

The first lens 36, the main spacer 33a, the intermediate spacer 33c, and joined lenses (i.e. a lens unit) are, as illustrated in FIG. 16, fitted in the lens barrel body 232a in this order. Specifically, the first lens 36 is first inserted into the storage chamber 231a from the rear opening of the lens barrel body 232a with the front convex surface 360 facing the outside view until the front supporting surface 361a of the first lens 36 contacts the front axial force-applying surface 325a, thereby closing the lens opening 326. In this way, the first lens 36 is retained at the outer peripheral supporting surface 364 by the front end portion of the inner cylindrical surface 320b.

Next, the main spacer 33a in which the second lens 37, the sub-spacer 33b, and the third lens 38a are disposed is inserted into the storage chamber 231a of the lens barrel body 232a with the first axial force-applying surface 332a facing the outside view. The main spacer 33a is inserted into the storage chamber 231a until the first axial force-applying surface 332a contacts the rear supporting surface 363, so that it is stopped by the first lens 36 from moving toward the outside view. In this way, the main spacer 33a is retained at the outer peripheral cylindrical surfaces 331b by the lens barrel protrusions 320a.

The intermediate spacer 33c is then inserted into the storage chamber 231a of the lens barrel body 232a with the front support 323a facing the outside view. The intermediate spacer 33c is inserted into the storage chamber 231a until the front support 323a contacts the rear convex surface 383 of the third lens 38a, so that it is stopped from moving toward the outside view. In this way, the intermediate spacer 33c is radially retained by the lens barrel protrusions 320a.

Subsequently, the fourth lens 38b and the fifth lens 38c that are lenses joined together in the form of a lens unit are disposed inside the storage chamber 231a of the lens barrel body 232a with the front convex surface 386 facing the outside view. Specifically, the fourth lens 38b is inserted into the storage chamber 231a until the front convex surface 360 contacts the rear support 323b, so that it is radially retained by the lens barrel protrusions 320a. The rear bracket 32c is then attached to the lens barrel body 232a. The rear bracket 32c has the rear axial force-applying surface 329 placed in direct contact with the rear supporting surface 387 of the fourth lens 38b, thereby applying the axial force Fax to the rear supporting surface 387. The axial force Fax is larger than each of the axial forces Fax1 and Fax2 illustrated in FIG. 13 in the first embodiment.

The axial force Fax exerts on the fourth lens 38b to press the front convex surface 386 of the fourth lens 38b against the rear support 323b of the intermediate spacer 33c, so that the fourth lens 38b is held between the rear bracket 32c and the intermediate spacer 33c and firmly retained by the lens barrel 232 using the axial force Fax.

The axial force Fax, as produced by the rear bracket 32c, is transmitted to the third lens 38a through the intermediate spacer 33c and then to the sub-spacer 33b through the third lens 38a. The axial force Fax is further transmitted to the second lens 37 through the sub-spacer 33b and then to the axial force-transmitting portion 332 through the second lens 37. In this way, the axial force Fax is exerted on the rear convex surface 383, the rear axial force-applying end surface 334, the rear supporting surface 374, and the second axial force-applying surface 332b. This causes the second lens 37 and the third lens 38a to hold the sub-spacer 33b therebetween and be firmly nipped between the axial force-transmitting portion 332 and the intermediate spacer 33c, so that they are fixed by the lens barrel 232 using the axial force Fax.

The transmission of the axial force Fax to the axial force-transmitting portion 332 causes the first axial force-applying surface 332a of the axial force-transmitting portion 332 to be firmly attached to the rear supporting surface 363 of the first lens 36 in an annular form, thereby applying the axial force Fax, as transmitted from the second lens 37, to the rear supporting surface 363. The front supporting surface 361a of the first lens 36 is, thus, pressed against the front axial force-applying surface 325a. The first lens 36 is, therefore, held between the lens barrel axial force applying portion 325 and the axial force-transmitting portion 332 and firmly fixed by the lens barrel 232 using the axial force Fax. In the above way, the lenses of the lens set 35 are positioned relative to each other along the optical axis A1.

The second embodiment offers substantially the same beneficial advantages as in the first embodiment. The structure of the lens holder 231 continues to apply the axial force Fax to the first lens 36 and the second lens 37 and enables the second lens 37 to be reduced in size without sacrificing the optical performance of the optical assembly 30.

The lens barrel 232 in the second embodiment has the lens barrel axial force applying portion 325 disposed in a recess or chamber defined by the step 361 formed in the first lens 36. This offers the same beneficial advantage as in the first embodiment that the diameter of the front end of the lens barrel 232 may be reduced to decrease the size of the camera module 1.

The optical assembly 30 in the second embodiment is designed to have the smaller-diameter second lens 37 and the smaller-diameter third lens 38a retained in the main spacer 33a. The whole of the lens barrel inner peripheral wall 320 of the lens barrel body 232a may, therefore, be shaped to have an inner diameter matching the outer diameter of the larger-diameter first lens 36, thereby enabling all the lenses 36 to 38c to be inserted in sequence into the lens barrel body 232a from the side of the imager 34. The structure of the optical assembly 30 in the second embodiment omits the front cap 32b, thereby enabling the front end portion of the lens barrel 232 near the first lens 36 to be reduced in diameter, which also enables the hood 40 or the camera module 1 to be reduced in size without sacrificing the optical performance of the camera module 1.

Modifications

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

Modification 1

The lens barrel 32 or 232 has the lens barrel axial force applying portion 325 placed in contact with the front convex surface 360 or the edge of the first lens 36 to exert the axial force on the first lens 36. This structure eliminates the need for the step 361 formed in the first lens 36.

Modification 2

The second lens 37 and the third lens 38a are shaped to have the same outer diameter as that of the first lens 36. The second lens 37 and the third lens 38a are, like the first lens 36, fit in the lens barrel inner peripheral wall 320 with outer peripheries thereof placed in direct contact with the inner surface of the lens barrel inner peripheral wall 320. This structurer eliminates the main spacer 33a.

Modification 3

The main spacer 33a is designed to have only the second lens 37 disposed therein. At least one of the third lens 38a to the fifth lens 38c disposed behind the second lens 37 has the outer peripheral surface retained by the lens barrel inner peripheral wall 320. The number, the layout, or the size of the lenses of the lens set 35 may be changed as needed. Over half of the lenses of the lens set 35 may be shaped to have aspheric surfaces. Alternatively, all of the lenses of the lens set 35 may be designed to have spherical surfaces.

The number, layout, or size of the inner convex portions 330a or the outer convex portions 331a of the main spacer 33a may be changed as needed. It is preferable that the main spacer 33a has three or more inner convex portions 330a or three or more outer convex portions 331a. The main spacer 33a may alternatively be designed to omit the intermediate convex portions 330c and have the six inner convex portions 330a formed on the spacer inner peripheral wall 330. The spacer inner peripheral wall 330 may also be formed to have ribs connecting the inner convex portions 330a together. Additionally, the spacer outer peripheral wall 331 may also have ribs connecting the outer convex portions 331a together. The number, layout, or size of the lens barrel protrusions 320a of the lens barrel 32 or 232 may be, like the inner convex portions 330a, change as needed. The lens barrel 32 or 232 is preferably shaped to have three or more lens barrel protrusions 320a. As long as the concentricity of the lens barrel 32 or 232, the second lens 37, and the main spacer 33a is ensured, the inner convex portions 330a, the outer convex portions 331a, and/or the lens barrel protrusions 320a may be omitted as needed.

The front cap 32b or the rear bracket 32c threadedly fastened to the lens barrel body 32a in the above embodiments may alternatively be secured to the lens barrel body 32a in another way, such as crimping or bonding. All the lenses 36 to 38c, unlike the second embodiment, may be inserted in sequence into the storage chamber 231a of the lens barrel body 232a from the outside view. This structure eliminates the need for the rear bracket 32c. The axial force, as produced by the front cap 32b, will be exerted on all the lenses 36 to 38c.

At least a portion of the control circuit 55 working to control the operation of the imager 34 may be realized by an external circuit, such as an ECU, arranged outside the camera casing 20. The control circuit 55 may control the exposure of the camera module 1 for use at a subsequent time to take an image using pixel values of a given range including pixels capturing a vehicle existing in the outside view. The control substrate 54 may omit the connecting hole 542. In this case, the imaging substrate 51 may be connected to the internal connector 543 arranged on an upper mounting surface of the control substrate 54 through or not through an FPC. The imaging substrate 51 may alternatively be connected to the internal connector 543 arranged on a lower mounting surface of the control substrate 54 using an FPC bypassing the outer periphery of the control substrate 54.

The camera casing 20 may be designed not to have at least one of the windshield-facing wall portion 210 or the recessed wall portion 212. An attachment pad may be secured to the front windshield 3 to directly retain the camera casing 20 without use of the bracket body 11. The hood 40 may be designed to be discrete from the bracket body 11. In this case, the hood 40 may have side walls whose inner surfaces are bent or curved. The optical block ribs 411 of the hood 40 may be shaped to have the same height. The hood 40 may alternatively shaped not to have the optical block ribs 411.

The camera module 1 may be designed to have a plurality of imagers or a plurality of lens holders. The camera module 1 may be attached to an inner surface of a rear windshield of the vehicle 2. In this case, the camera module 1 is oriented in a direction reversed to that in the above embodiments with the imager 34 facing the front of the vehicle 2.

What is claimed is:

1. A camera module which is attached to an inner side of a windshield of a vehicle and works to capture an image of an outside view from the vehicle, comprising:
    an imager configured to capture an image of an outside view;
    a lens set comprising an outside view lens and a small-diameter lens located closer to the imager than the outside view lens is and through which light from the outside view passes to form an image in the imager;
    a lens barrel within which the lens set is disposed; and
    an inner lens barrel disposed within the lens barrel and includes the small-diameter lens disposed therein,
    wherein the lens barrel includes a lens barrel axial force applying portion which retains the outside view lens using an axial force oriented along an optical axis of the lens set, and
    wherein the inner lens barrel is disposed between the small-diameter lens and the outside view lens and comprises an axial force-transmitting portion which transmits the axial force from one of the small-diameter lens and the outside view lens to the other,
    wherein the small-diameter lens is smaller in diameter than the outside view lens,
    wherein the outside view lens comprises a rear supporting surface extending substantially perpendicular to the optical axis, and
    wherein the axial force-transmitting portion is arranged between the outside view lens and the small-diameter lens,
    wherein the axial force-transmitting portion comprises an end portion that is in contact with the rear supporting surface of the outside view lens, and
    wherein the end portion protrudes radially inward toward the optical axis and is positioned radially closer to the optical axis than an outer peripheral supporting surface of the small-diameter lens.

2. The camera module as set forth in claim 1, wherein the outside view lens comprises an optical surface that faces the outside view and a step located outside the optical surface in a radial direction of the outside view lens, and wherein the lens barrel axial force applying portion exerts the axial force on the step.

3. The camera module as set forth in claim 2, wherein the step is located radially outside the small-diameter lens, which includes a small-diameter contact surface that contacts the axial force-transmitting portion,
    wherein, with reference to the optical axis of the lens set, the small-diameter contact surface is disposed radially inward relative to a position of the step of the outside view lens, and
    wherein the axial force-transmitting portion is placed in contact with the outside view lens and shaped to protrude radially inward of the outer peripheral supporting surface of the small-diameter lens.

4. The camera module as set forth in claim 1, wherein an inner peripheral wall of the inner lens barrel comprises a plurality of inner convex portions which protrude radially inward and have inner peripheral cylindrical surfaces retaining the small-diameter lens.

5. The camera module as set forth in claim 1, wherein the inner lens barrel comprises an outer peripheral wall equipped with a plurality of outer convex portions which protrude radially outward and are retained by an inner peripheral wall of the lens barrel.

6. The camera module as set forth in claim 5, wherein the inner peripheral wall of the lens barrel comprises a plurality of lens barrel protrusions which protrude radially inward and have partial cylindrical surfaces retaining the outer convex portions, respectively.

7. The camera module as set forth in claim 1, wherein an outer diameter of the inner lens barrel is substantially identical to an outer diameter of the outside view lens.

8. The camera module as set forth in claim 1, wherein the outside view lens engages the lens barrel along a lens barrel inner peripheral wall of the lens barrel.

9. The camera module as set forth in claim 1, wherein
    an inner diameter of the lens barrel is constant along the optical axis,
    an outer diameter of the inner lens barrel is constant along the optical axis, and
    the outer diameter of the inner lens barrel is substantially identical to the inner diameter of the lens barrel.

* * * * *